(12) United States Patent
Isozaki et al.

(10) Patent No.: US 8,984,302 B2
(45) Date of Patent: Mar. 17, 2015

(54) INFORMATION PROCESSING APPARATUS

(71) Applicant: Kabushiki Kaisha Toshiba, Minato-ku, Tokyo (JP)

(72) Inventors: Hiroshi Isozaki, Kawasaki (JP); Atsushi Hirota, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 14/014,963

(22) Filed: Aug. 30, 2013

(65) Prior Publication Data

US 2014/0122902 A1 May 1, 2014

(30) Foreign Application Priority Data

Oct. 31, 2012 (JP) ................................. 2012-240257

(51) Int. Cl.
*G06F 12/04* (2006.01)
*G06F 12/14* (2006.01)
*G06F 21/70* (2013.01)

(52) U.S. Cl.
CPC ........ *G06F 12/1408* (2013.01); *G06F 12/1433* (2013.01); *G06F 21/70* (2013.01)
USPC .......................................................... 713/193

(58) Field of Classification Search
USPC .......................................................... 713/193
See application file for complete search history.

(56) References Cited

U.S. PATENT DOCUMENTS

| 6,986,052 | B1 | | 1/2006 | Mittal |
| 7,237,081 | B2 | * | 6/2007 | Dahan et al. ................... 711/163 |
| 7,586,855 | B1 | * | 9/2009 | Yellai et al. .................... 370/255 |
| 7,917,762 | B2 | | 3/2011 | Lewis et al. |
| 8,332,653 | B2 | * | 12/2012 | Buer .............................. 713/189 |
| 8,601,229 | B2 | * | 12/2013 | Morgan et al. ................ 711/163 |
| 8,775,784 | B2 | * | 7/2014 | Diluoffo et al. .................. 713/2 |
| 8,819,839 | B2 | * | 8/2014 | Henry et al. ..................... 726/26 |
| 8,838,924 | B2 | * | 9/2014 | Henry et al. .................. 711/163 |

FOREIGN PATENT DOCUMENTS

| JP | 2007-019867 | 1/2007 |
| JP | 2007-102791 | 4/2007 |
| JP | 2012-053898 | 3/2012 |
| JP | 2012-518213 | 8/2012 |

* cited by examiner

*Primary Examiner* — Beemnet Dada
(74) *Attorney, Agent, or Firm* — Knobbe, Martens, Olson & Bear LLP

(57) ABSTRACT

According to one embodiment, a first processor of an information processing apparatus switches between a secure mode and a non-secure mode and reports its mode. When the first processor is in the secure mode, a second processor accesses to a protected area of a storage module. A boot program for the first processor and a program which activates the first processor in the non-secure mode are verified. Furthermore, a program which activates the first processor in the secure mode is encrypted, and its decryption key is stored in the protected area of the storage module.

9 Claims, 32 Drawing Sheets

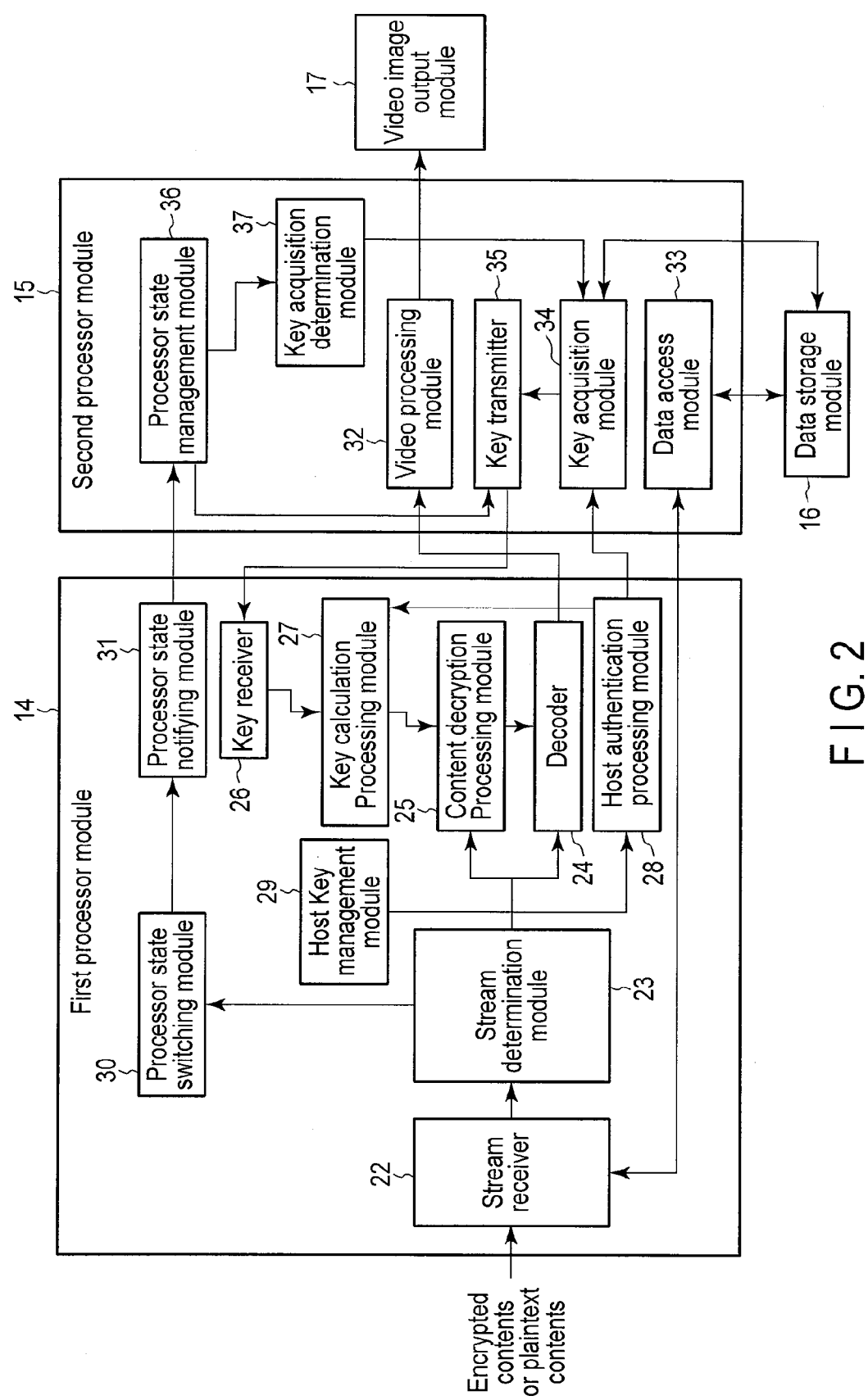
F I G. 2

| | Secure mode | Non-secure mode |
|---|---|---|
| Secure area | Accessible | Inaccessible |
| Shared area | Accessible | Accessible |
| Non-secure area | Accessible | Accessible |

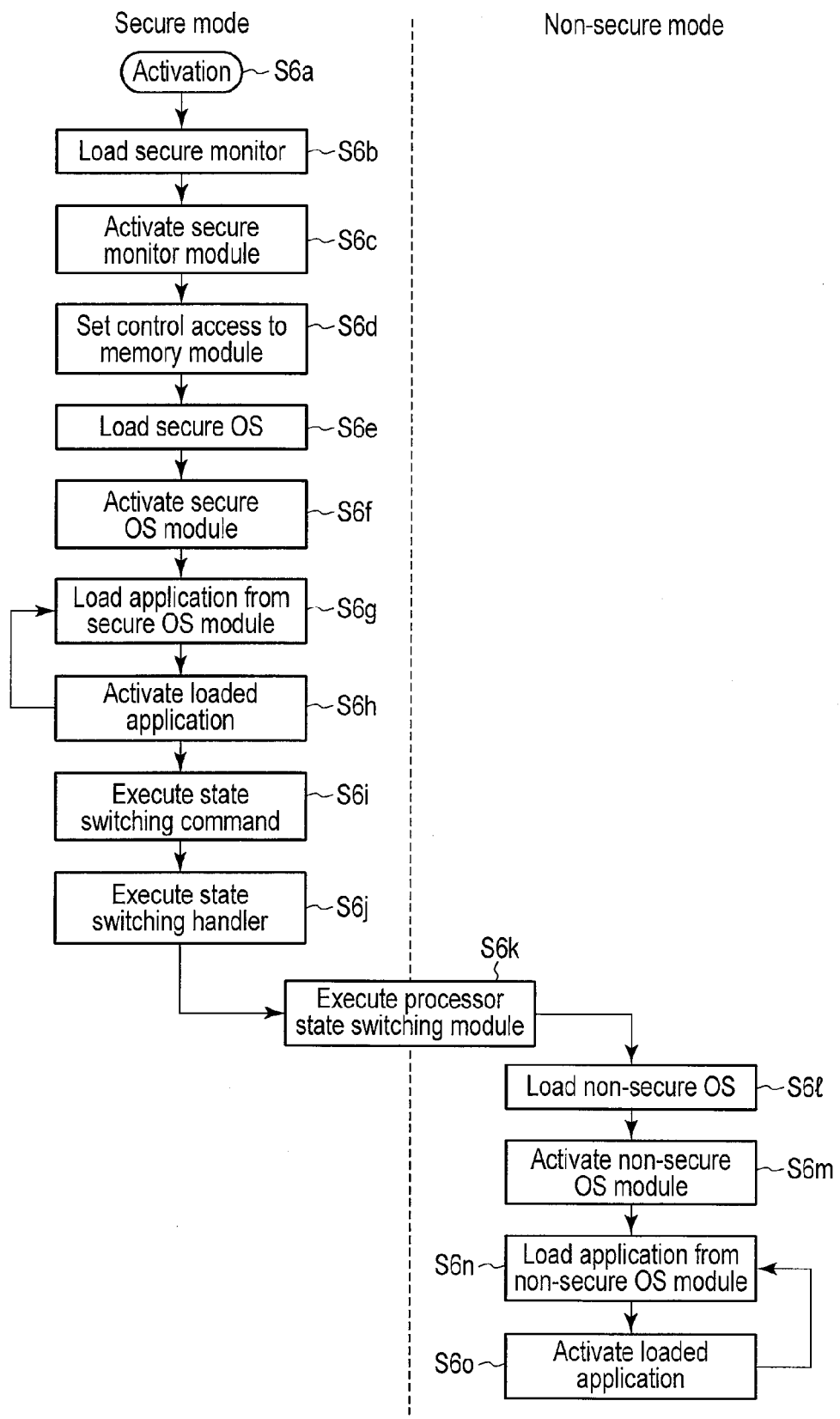
F I G. 6

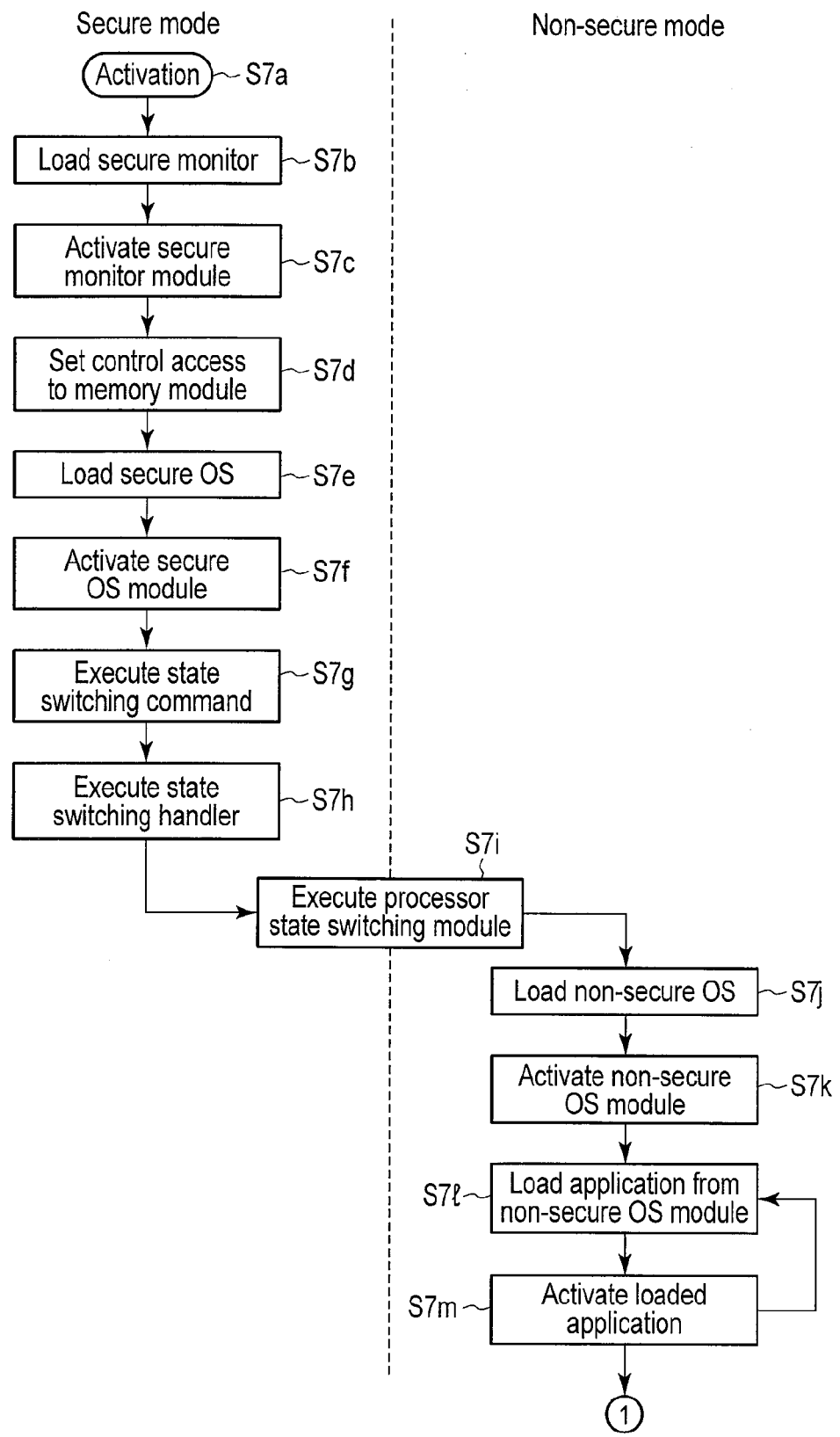
F I G. 7

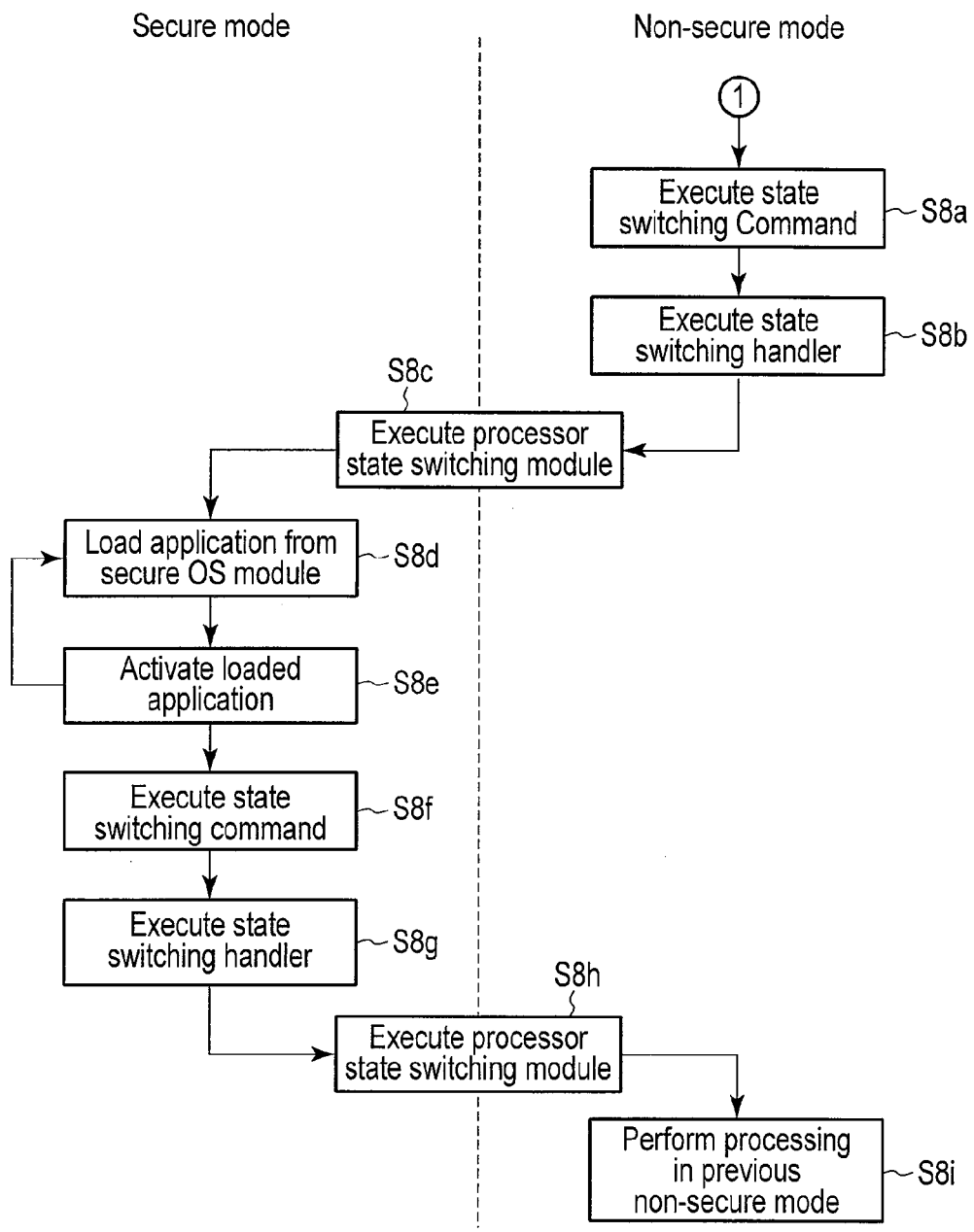
F I G. 8

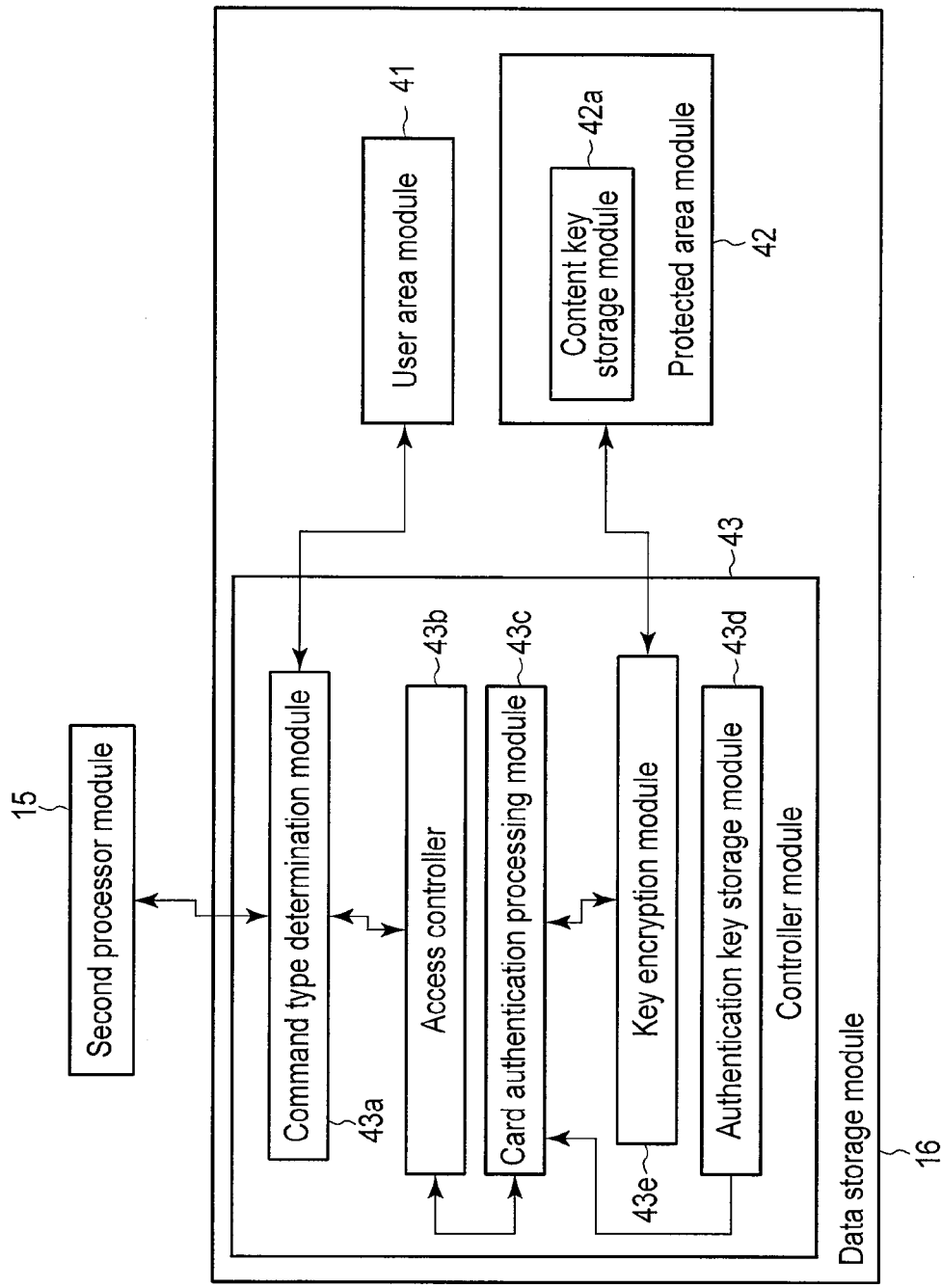
F I G. 9

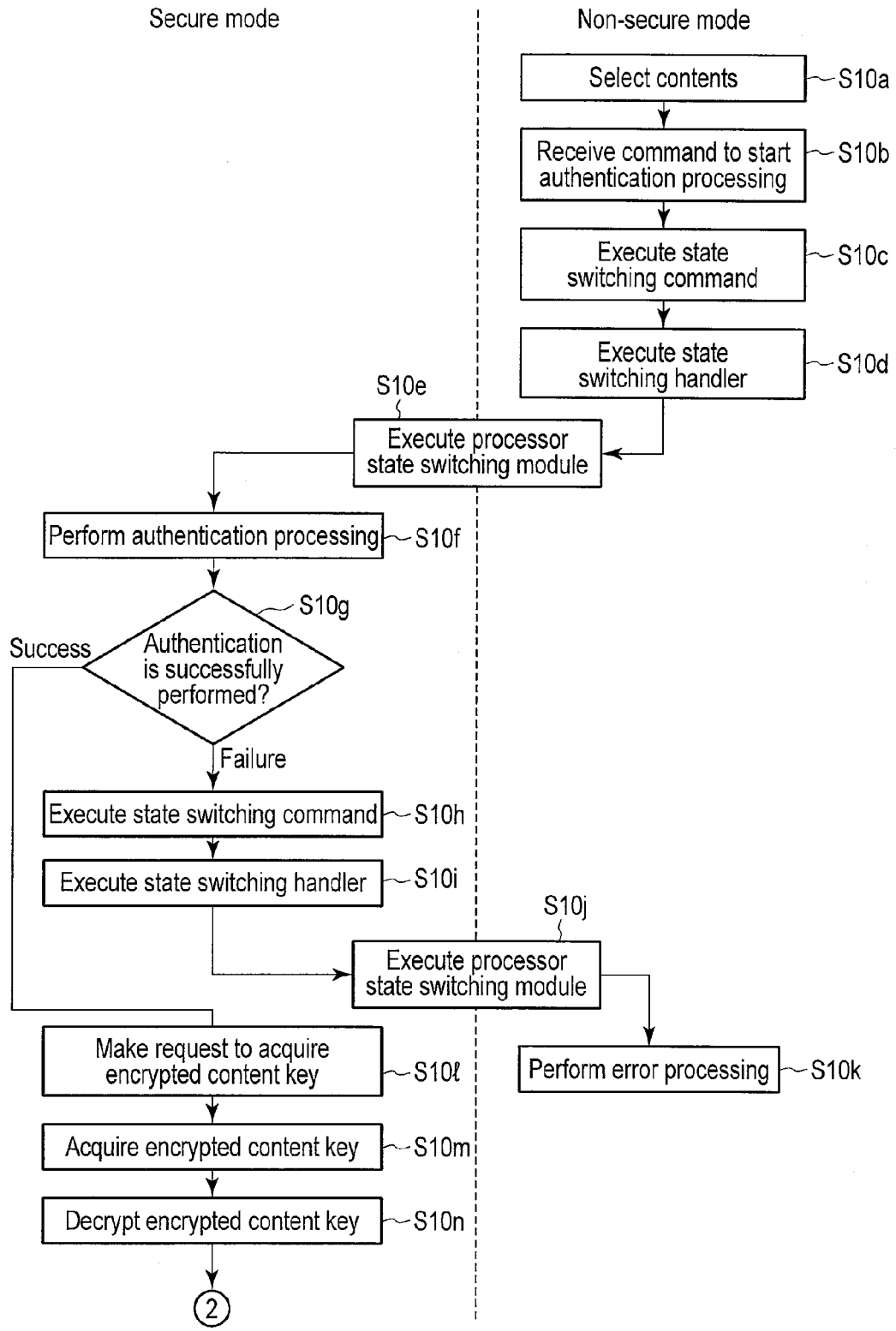
F I G. 10

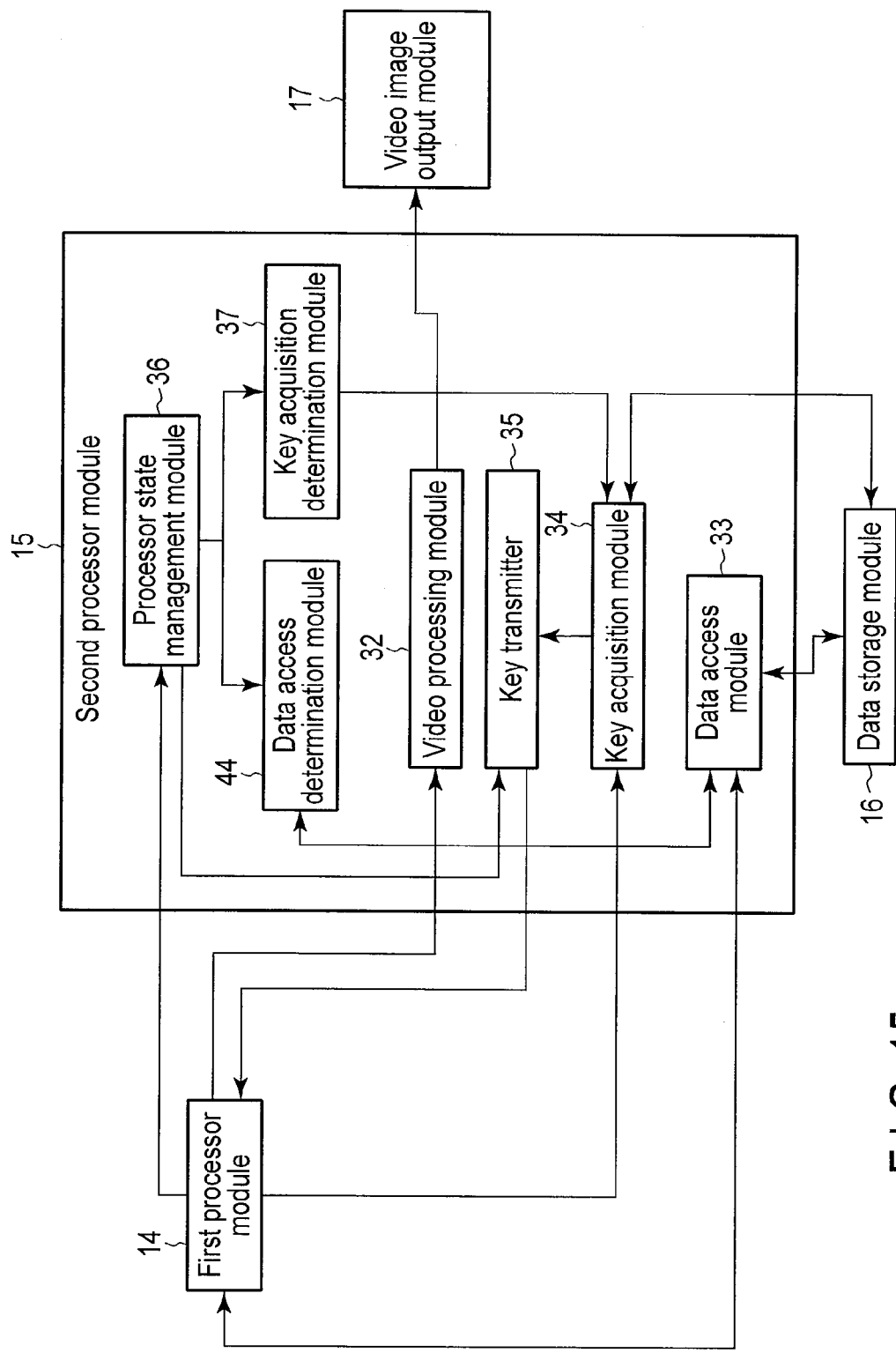
F I G. 15

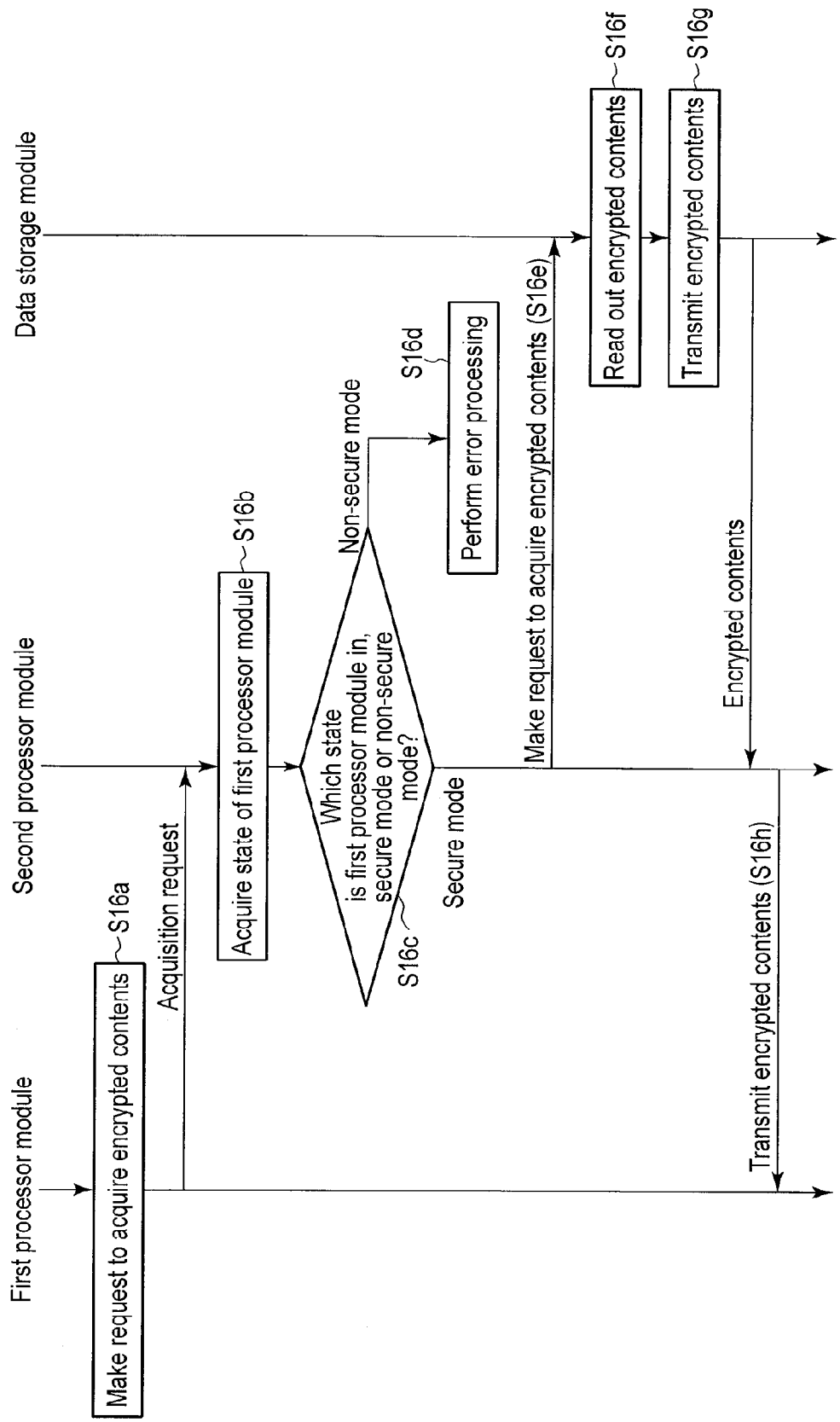
F I G. 16

| | Secure mode | Non-secure mode | |
|---|---|---|---|
| | | Read access | Write access |
| Secure area | Accessible | Inaccessible | Inaccessible |
| Shared area 1 | Accessible | Permitted | Permitted |
| Shared area 2 | Accessible | Prohibited | Permitted |
| Non-secure area | Accessible | Permitted | Permitted |

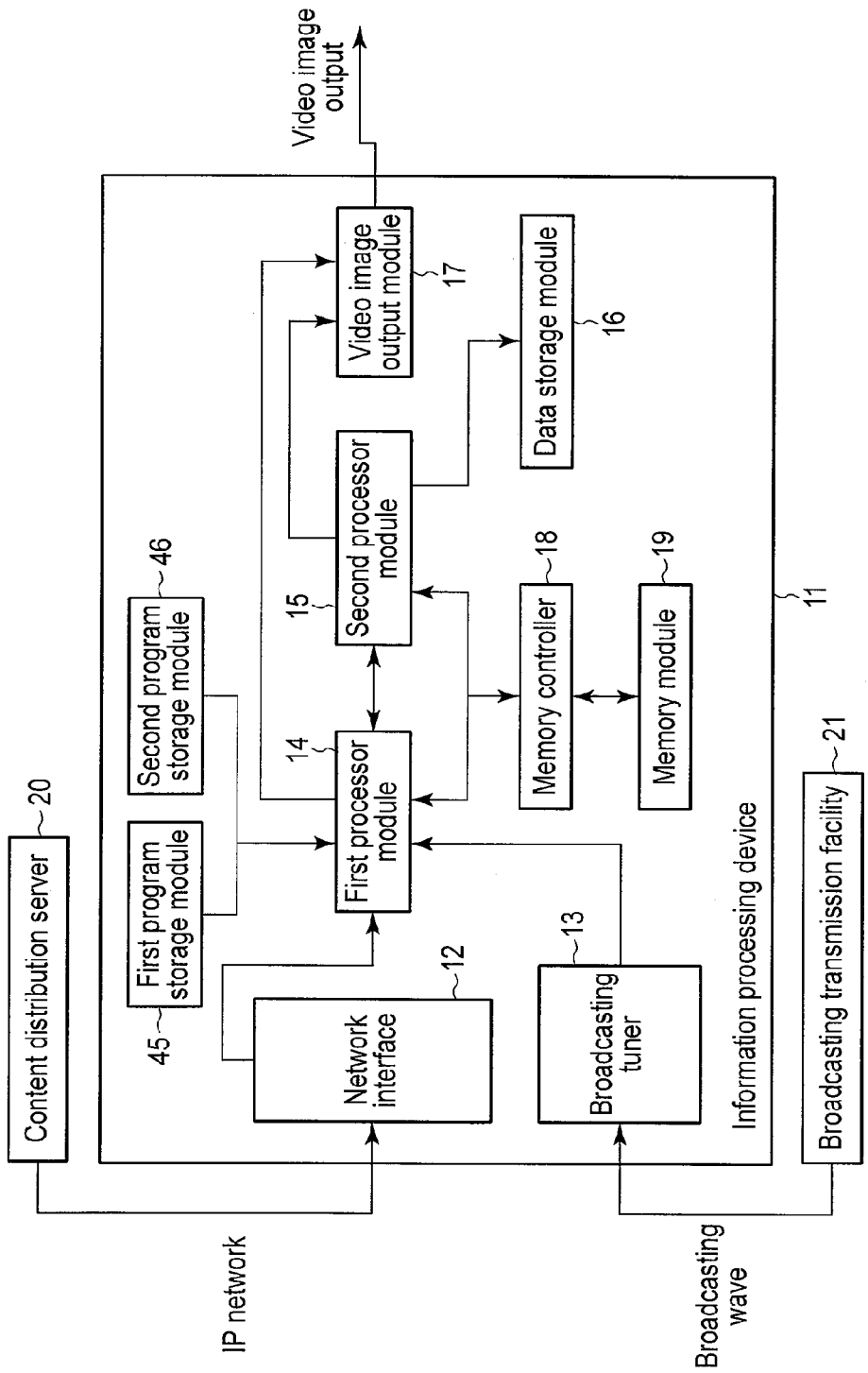
F I G. 19

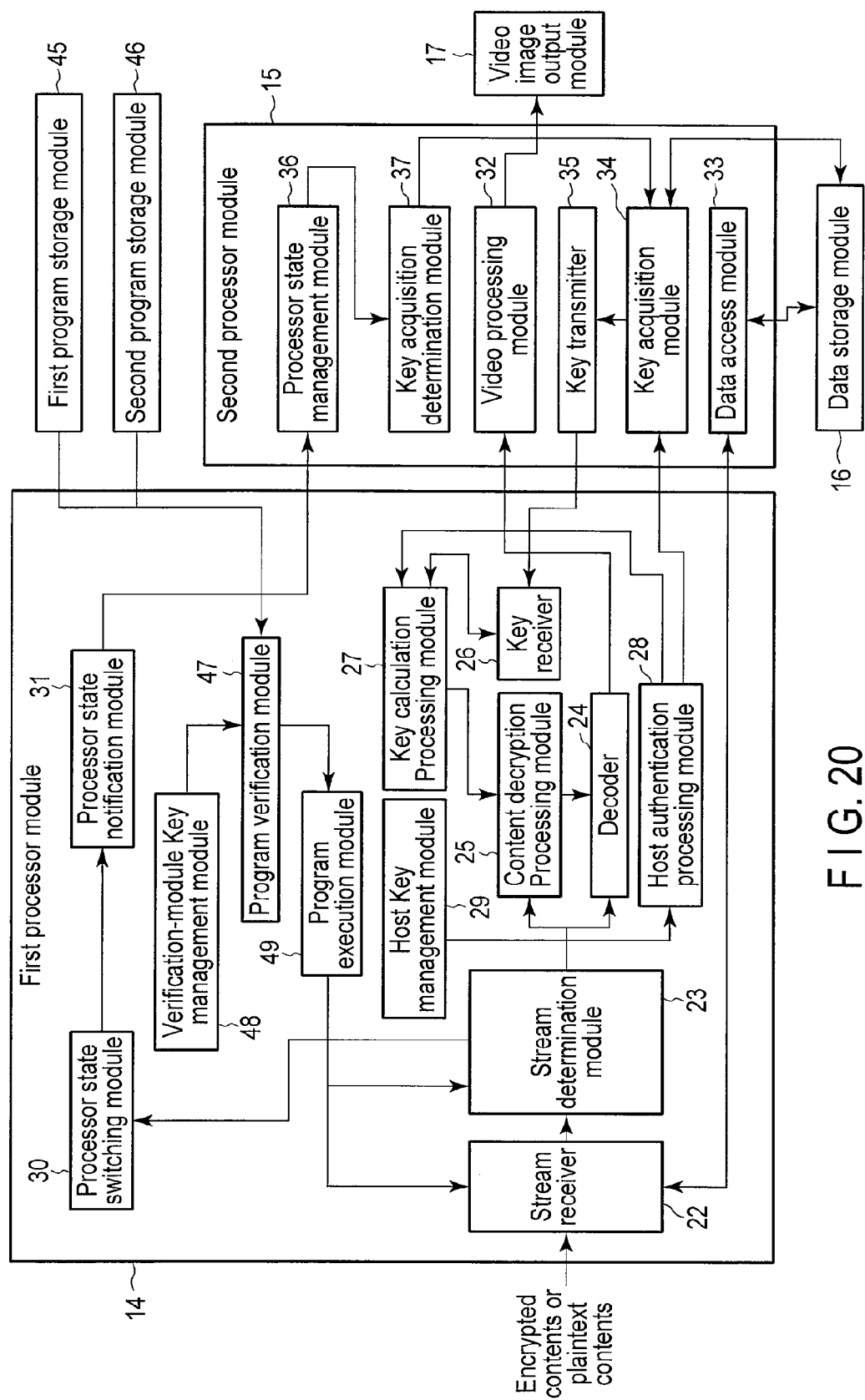
F I G. 20

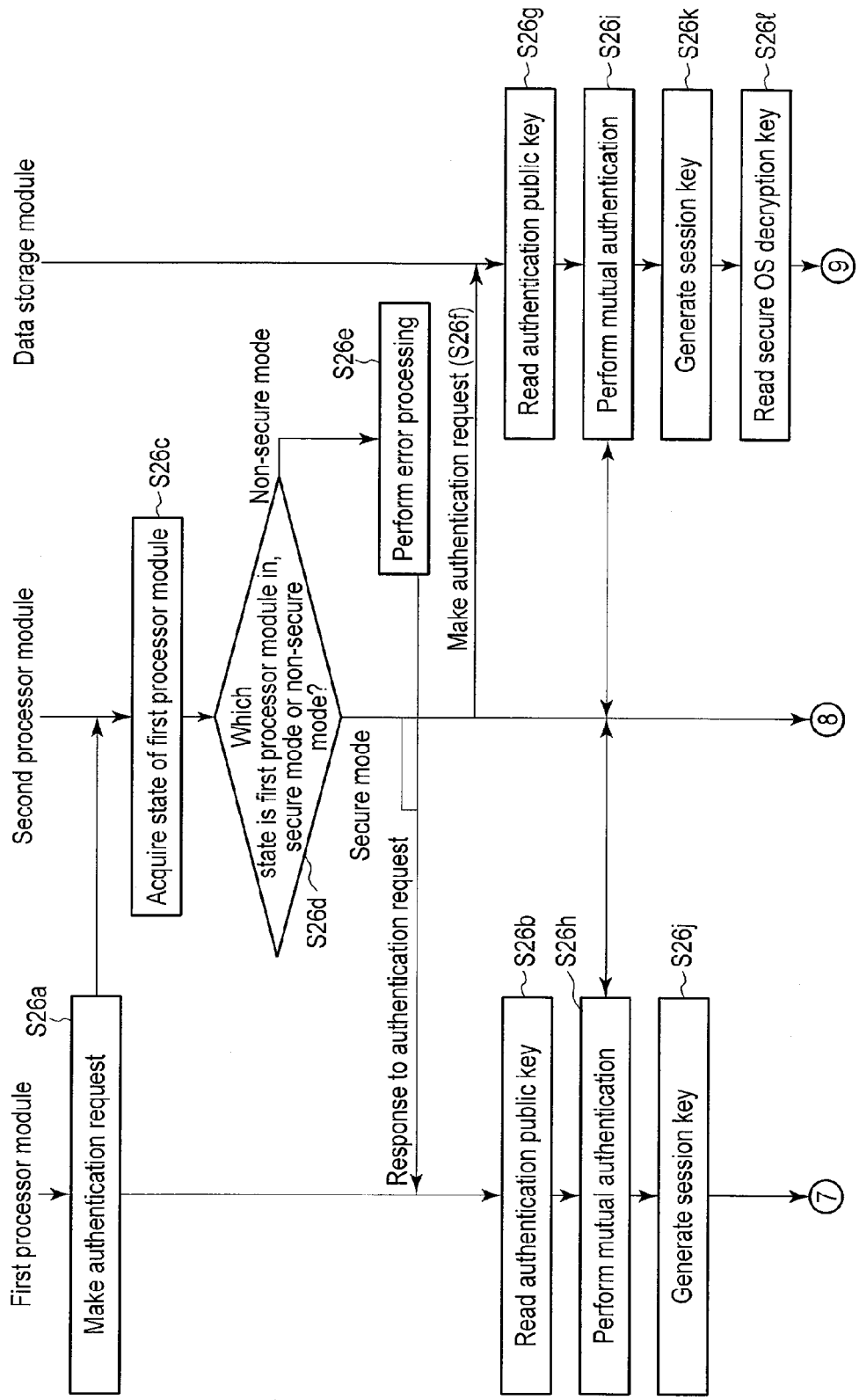
F I G. 26

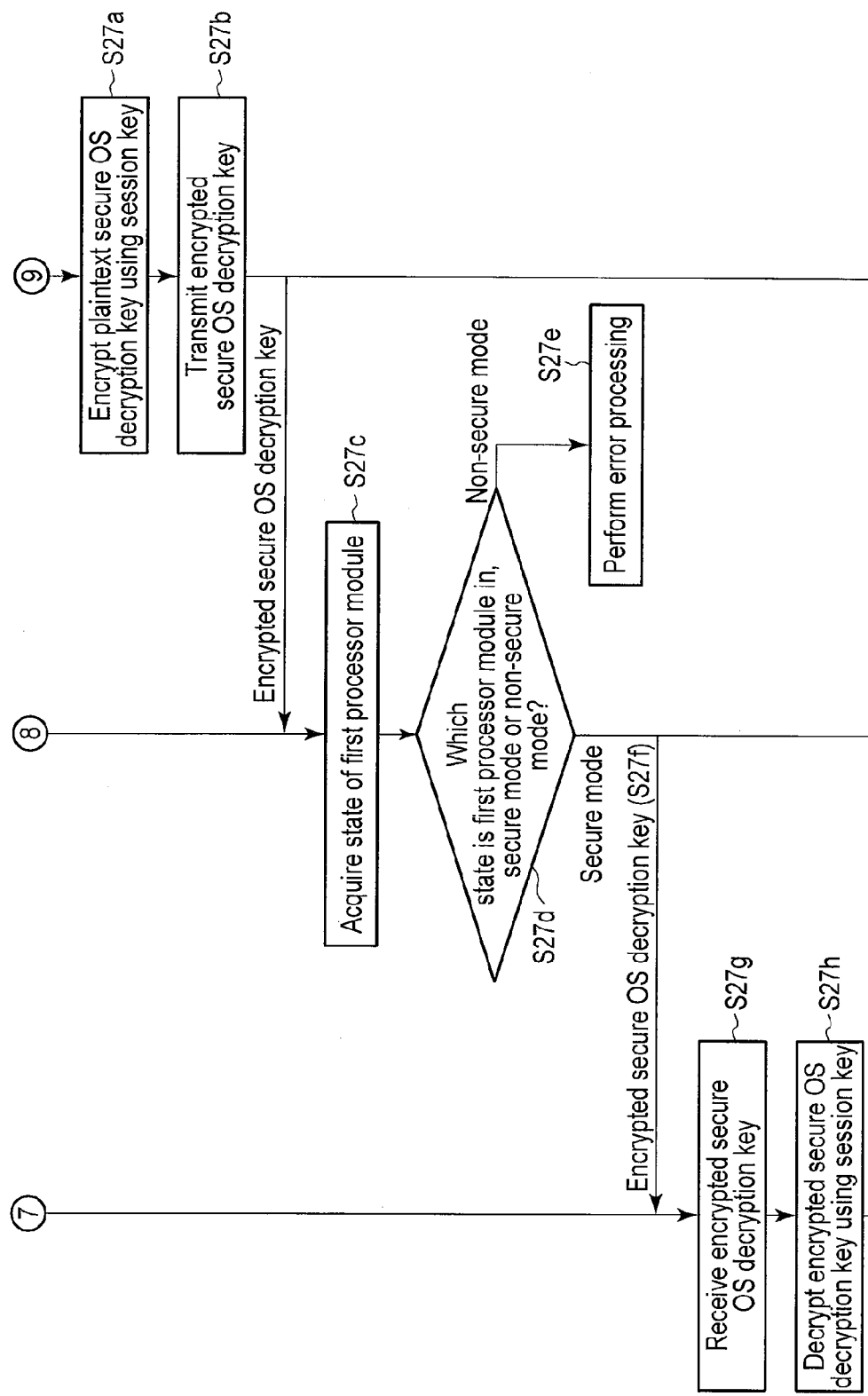
F I G. 27

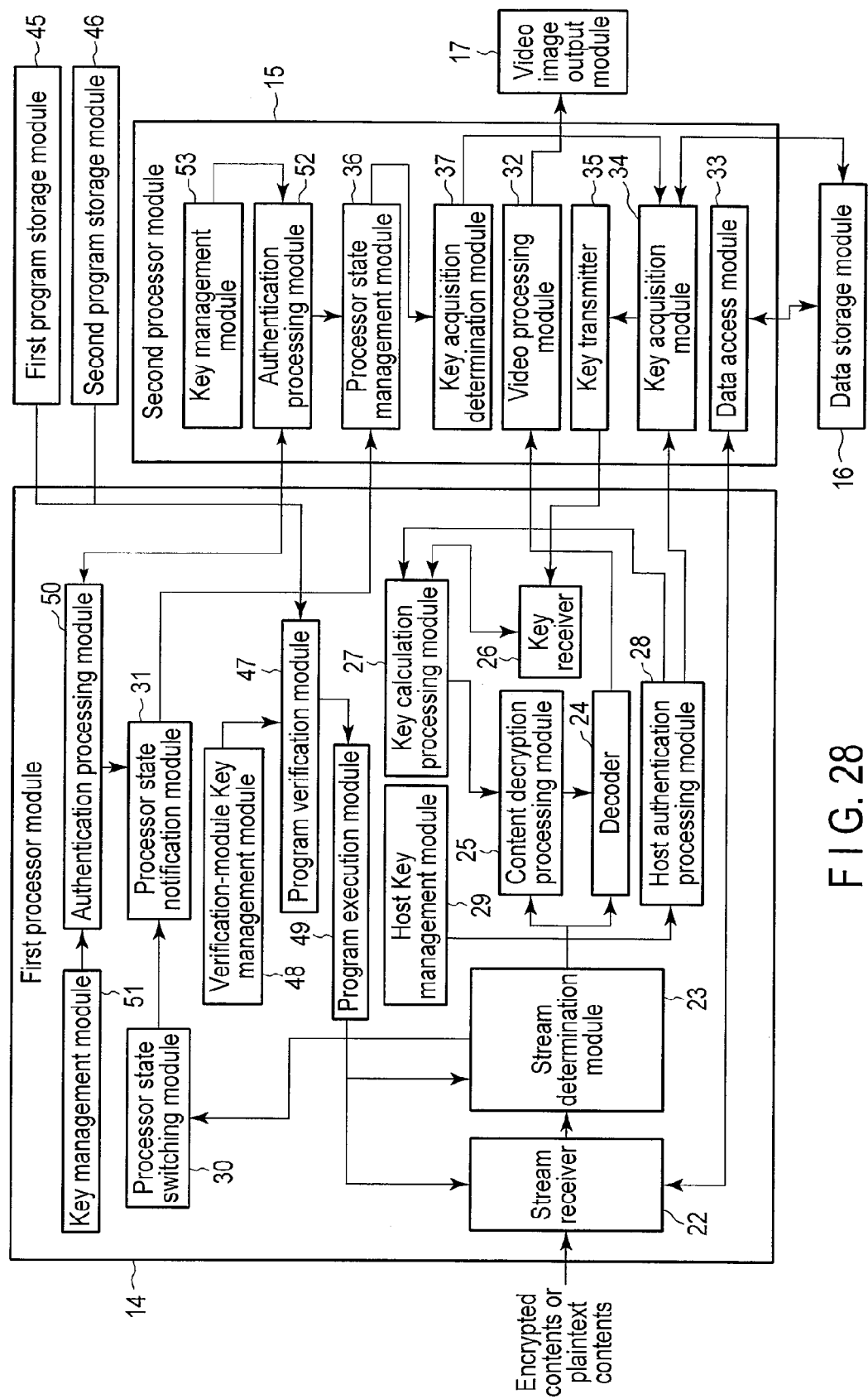
F I G. 28

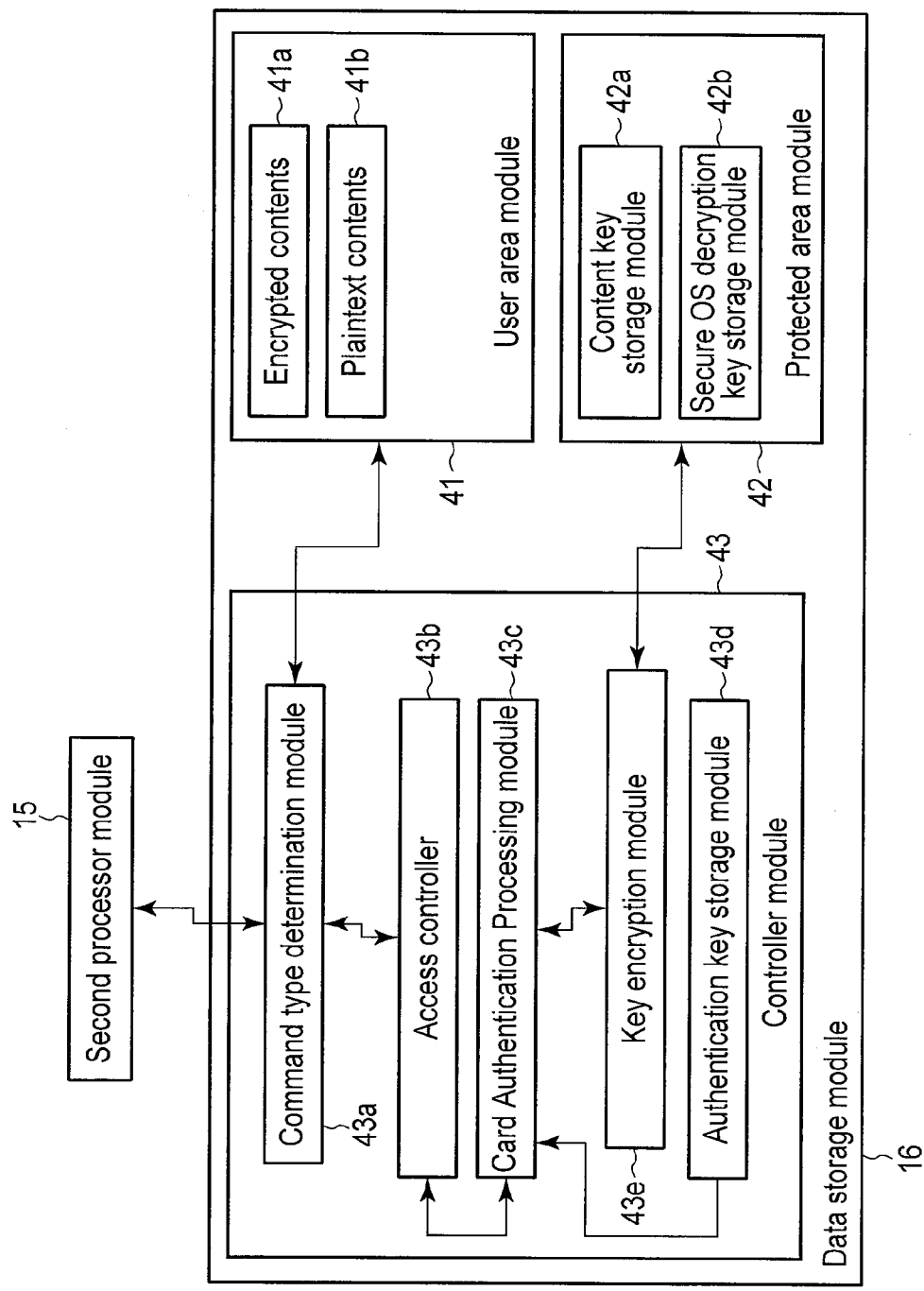
F I G. 30

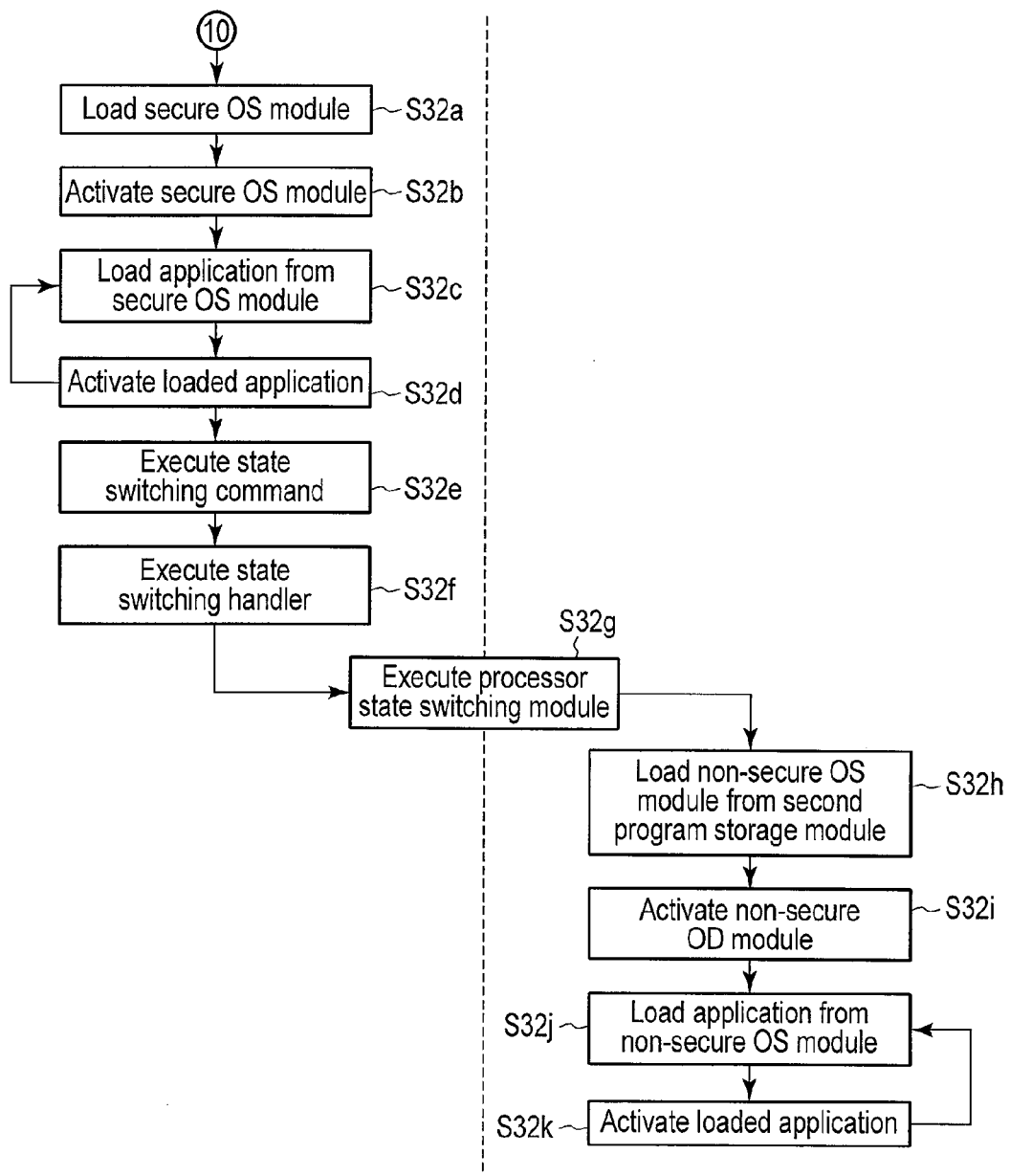
F I G. 32

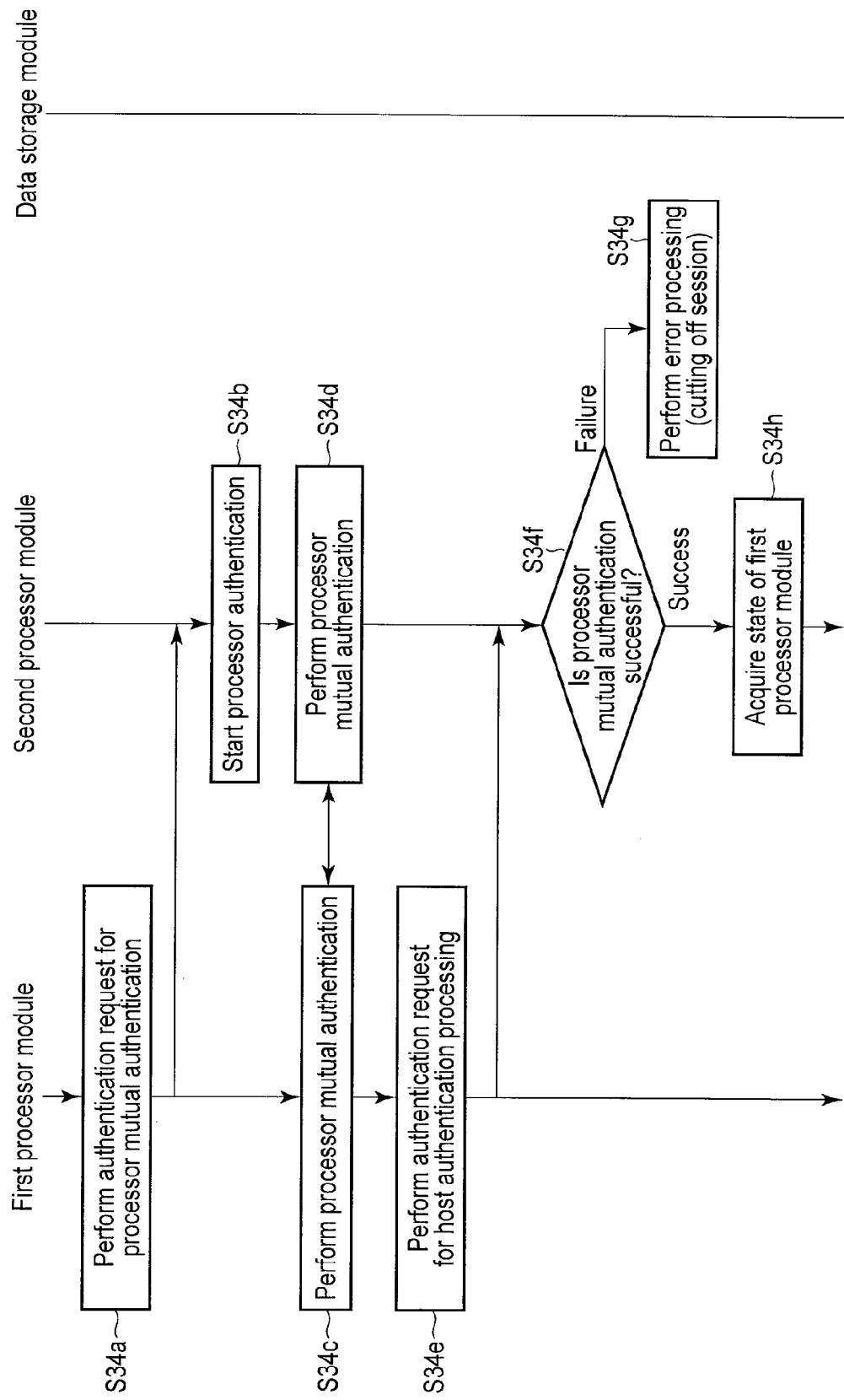
F I G. 34

INFORMATION PROCESSING APPARATUS

CROSS-REFERENCE TO RELATED APPLICATIONS

This application is based upon and claims the benefit of priority from Japanese Patent Application No. 2012-240257, filed Oct. 31, 2012, the entire contents of which are incorporated herein by reference.

FIELD

Embodiments described herein relate generally to an information processing apparatus which controls access to a data storage module including a protected area.

BACKGROUND

As is well known, nowadays a content distribution system with DRM (Digital Rights Management) becomes widespread. In the content distribution system with DRM, when a content distributor distributes contents including a video image and audio, the contents are distributed while encrypted in order to protect a content copyright, and the encrypted contents are received and decrypted with a legitimate information processing device to which the content distributor provides a content key, thereby preventing the illegal acquisition of the contents.

Specifically, the content key is stored in a protected area of a data storage module, such as an SD (Secure Digital) memory card. The data storage module encrypts and transmits the content key stored in the protected area upon a request from the information processing device that successfully performs mutual authentication.

Therefore, the information processing device generates a key in order to decrypt the encrypted content key acquired from the data storage module based on an authentication key included in application software running on an OS (Operation System) that is of own operating software of the information processing device, and the information processing device decrypts the encrypted contents using the content key decrypted by the key.

In the current content distribution system, key calculation processing is performed by application software of the information processing device. When an analyst seeking to illegally obtain the contents analyzes the key calculation processing, which is used to decrypt the encrypted content key, to obtain a value of the content key, the encrypted contents are decrypted by the content key, which allows the analyst to illegally obtain the contents.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block configuration diagram illustrating an example of first and second processor modules constituting the information processing device of the first embodiment;

FIG. 6 is a flowchart illustrating an example of a processing operation during initialization processing of the first processor module of the first embodiment;

FIG. 7 is a flowchart illustrating part of another example of the processing operation during the initialization processing of the first processor module of the first embodiment;

FIG. 8 is a flowchart illustrating the rest of another example of the processing operation during the initialization processing of the first processor module of the first embodiment;

FIG. 9 is a block configuration diagram illustrating an example of a data storage module constituting the information processing device of the first embodiment;

FIG. 10 is a flowchart illustrating part of an example of a processing operation in which the first processor module of the first embodiment decrypts an encrypted content;

FIG. 15 is a block configuration diagram illustrating another example of the second processor module of the first embodiment;

FIG. 16 is a flowchart illustrating an example of a processing operation in which the first processor module of the first embodiment acquires the encrypted content from a user area;

FIG. 19 is a block configuration diagram schematically illustrating an example of a signal processing system of an information processing device according to a second embodiment;

FIG. 20 is a block configuration diagram illustrating an example of first and second processor modules constituting the information processing device of the second embodiment;

FIG. 26 is a flowchart illustrating part of an example of a processing operation in which the first processor module of the second embodiment acquires a secure OS decrypted key from the protected area;

FIG. 27 is a flowchart illustrating the rest of an example of the processing operation in which the first processor module of the second embodiment acquires the secure OS decrypted key from the protected area;

FIG. 28 is a block configuration diagram illustrating another example of the first and second processor modules of the second embodiment;

FIG. 30 is a block configuration diagram illustrating another example of a data storage module of the second embodiment;

FIG. 32 is a flowchart illustrating the rest of another example of the processing operation during the boot of the first processor module of the second embodiment including the secure OS;

FIG. 34 is a flowchart illustrating another example of the processing operation in which the first and second processor modules of the second embodiment perform the mutual authentication.

DETAILED DESCRIPTION

Various embodiments will be described hereinafter with reference to the accompanying drawings.

In general, according to one embodiment, a first processor of an information processing apparatus switches between a secure mode and a non-secure mode and reports its mode. When the first processor is in the secure mode, a second processor accesses to a protected area of a storage module. A boot program for the first processor and a program which activates the first processor in the non-secure mode are verified. Furthermore, a program which activates the first processor in the secure mode is encrypted, and its decryption key is stored in the protected area of the storage module.

That is, the information processing apparatus includes the first processor, the storage module, a second processor, a key managing module, an authenticating module, and a program storage module. The first processor is configured to selectively switch between the secure mode and the non-secure mode, to perform data processing in each mode, and to report state information indicative of the mode of the first processor. The storage module comprises a protected area and a user area. The second processor is configured to access the storage module based on a request from the first processor. The key managing module is configured to manage a first key in order to restrict access to the protected area of the storage module. The authenticating module is configured to permit access to the protected area only when an authentication performed using the first key is successful. The program storage module is configured to store a secure monitor and a boot loader.

In addition, the boot loader is configured to activate the secure monitor. The secure monitor is configured to switch between the secure mode and the non-secure mode and to activate an operating system for causing the first processor to operate in the secure mode.

Furthermore, the second processor comprises a first access determining module, a first data accessing module, and a second data accessing module. The first access determining module is configured to permit the first data accessing module to access the storage module when the first processor is in the secure mode. The first data accessing module is configured to receive data for authentication from the storage module and to transmit the data for authentication to the first processor, based on a request from the first processor. The second data accessing module is configured to access the user area of the storage module based on a request from the first processor.

The operating system is encrypted and a decryption key for the encrypted operating system is stored in the protected area of the storage module.

Figure 1:
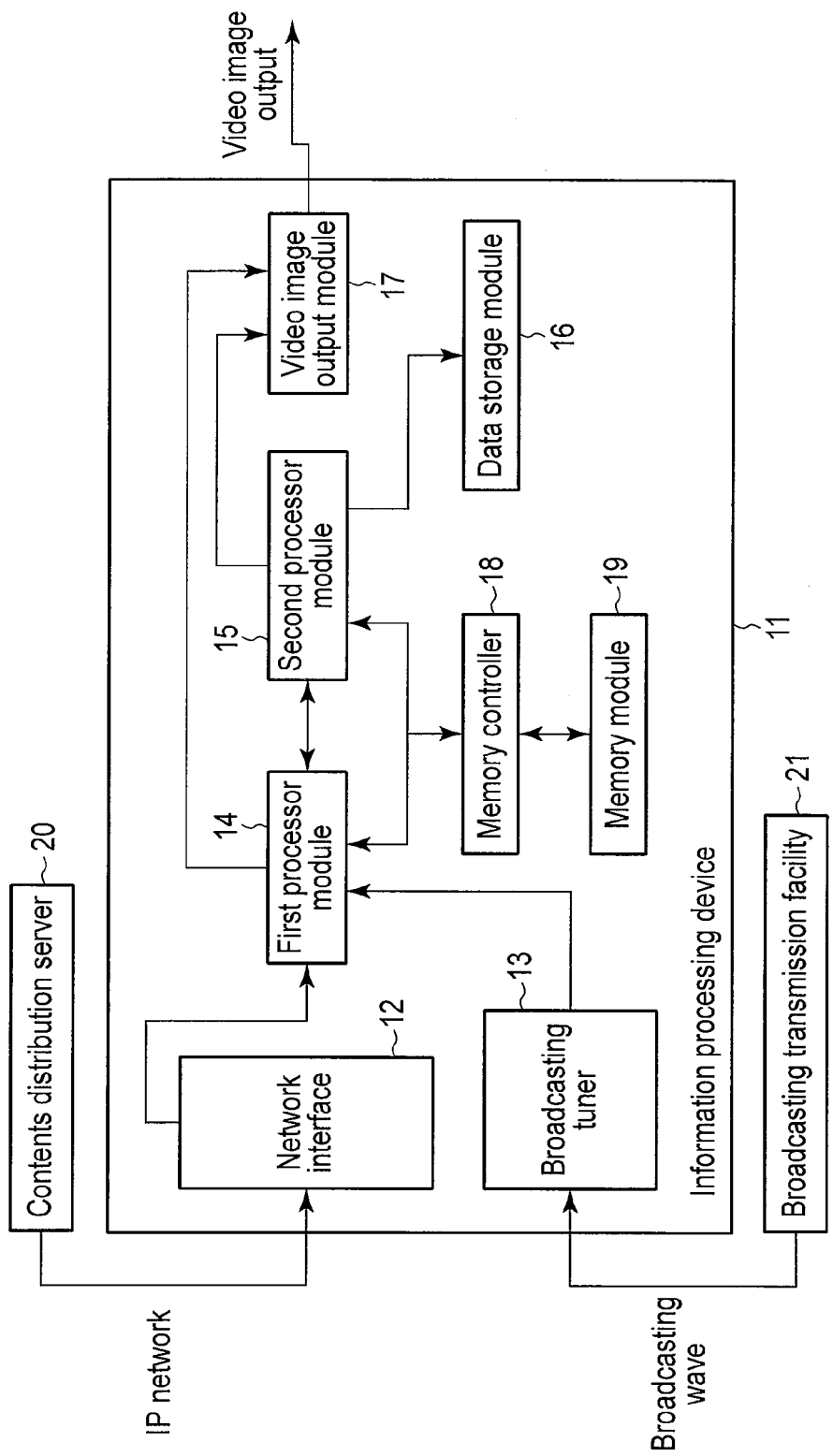
FIG. 1 is a block configuration diagram schematically illustrating an example of a signal processing system of an information processing device according to a first embodiment.

FIG. 1 schematically illustrates a signal processing system of an information processing device 11 according to a first embodiment. For example, a digital television broadcasting receiver or an STB (Set Top Box) is assumed to be the information processing device 11.

The information processing device 11 includes a network interface 12, a broadcasting tuner 13, a first processor module 14, a second processor module 15, a data storage module 16, a video image output module 17, a memory controller 18, and a memory module 19.

The network interface 12 acquires contents including a video image and an audio, which are transmitted from an external content distribution server 20 through an IP (Internet Protocol) network, and outputs the contents to the first processor module 14.

The broadcasting tuner 13 receives, tunes, and demodulates a broadcasting wave transmitted from an external broadcasting transmission facility 21, thereby acquiring the contents including the video image and the audio. The broadcasting tuner 13 outputs the contents to the first processor module 14.

In this case, the network interface 12 and the broadcasting tuner 13 are assumed to have a function of acquiring a video content having resolution, which is called 4K2K of four times HDTV (High-Definition Television) and includes 3840 pixels in a horizontal direction and 2160 pixels in a vertical direction, or a video content having resolution more than 4K2K. Additionally the network interface 12 and the broadcasting tuner 13 may have a function of acquiring a video content having resolution of SD (Standard-Definition) or HD.

The first processor module 14 performs decode processing to the contents, which are selectively supplied from the network interface 12 and broadcasting tuner 13, and outputs the decoded contents to the second processor module 15.

In the case that the contents selectively supplied from the network interface 12 and broadcasting tuner 13 are encrypted, the first processor module 14 acquires a content key stored in a protected area of the data storage module 16 through the second processor module 15. After decrypting the encrypted content using the acquired content key, the first processor module 14 performs the decode processing to the decrypted contents to and outputs the contents to the second processor module 15.

When distributing the encrypted contents to the information processing device 11, the content distribution server 20 may perform authentication processing in order to check whether a legitimate key is stored in the data storage module 16 of the information processing device 11, or perform the authentication processing in which, for example, a CPRM (Content Protection for Recordable Media) standard is used in order to determine whether software (an application) running in the first processor module 14 of the information processing device 11 has the legitimate key. Well-known techniques, such as ISO/IEC9798-3 and ISO/IEC9798-2, may be used as an authentication method, and there is no particular limitation to the authentication means.

For example, the first processor module 14 has a TrustZone function that is of a security function of an ARM processor. Although the detailed description is made later, the first processor module 14 executes a program while selectively switching between a secure mode and a non-secure mode.

At this point, in the secure mode, the first processor module 14 performs pieces of processing, such as the authentication processing with the data storage module 16, processing of access to the protected area of the data storage module 16, processing of generating the content key based on a DRM (Digital Rights Management) function, and processing of decrypting the encrypted contents using the content key, in which confidentiality or integrity are required.

In the non-secure mode, the first processor module 14 performs pieces of processing, such as browser processing of executing a Web application constructed by an HTML or a JavaScript (registered trademark), which are acquired by communication with the content distribution server 20, processing of generating GUIs (Graphical User Interfaces), such as a content list as a result of the execution of the Web application, and processing of receiving an input from external devices, such as an infrared remote controller, to switch the tuner or operate a browser, for which security is not required.

The second processor module 15 performs predetermined pieces of video signal processing, such as superresolution processing and image recognition processing, to the decoded video contents supplied from the first processor module 14, and outputs the video contents to the video image output module 17. The video image output module 17 supplies the decoded video content to video display modules (not illustrated), such as a built-in display module, to display the video image, or transmits the decoded video content to the outside through transmission lines, such as an HDMI (High-Definition Multimedia Interface), which are compliant with a predetermined transmission standard.

After an audio processing module (not illustrated) performs predetermined audio signal processing to the decoded audio contents output from the first processor module 14, the audio contents are used in audio playback with a speaker or for transmission outside.

At this point, for example, the data storage module 16 is assumed to be an SD memory card compliant with the CPRM standard. The data storage module 16 is configured to transmit data about the authentication processing with the first processor module 14 or data about processing of receiving a content key acquisition request from the first processor module 14, encrypting the content key stored in the protected area, and outputting the encrypted content key to the first processor module 14, to the first processor module 14 through the second processor module 15.

The data storage module 16 may be detachably attached to the information processing device 11, or the data storage module 16 may be incorporated in the information processing device 11 so as not to be detached from the information processing device 11.

For example, the memory module 19 is a working memory assumed to be a DRAM (Dynamic Random Access Memory), and the memory controller 18 is assumed to be a DRAM controller. Under the control of the memory controller 18 that receives instructions from the first processor module 14 and second processor module 15, the memory area is divided according to the application, and various pieces of data are written in and read from the memory area.

FIG. 2 illustrates an example of the first processor module 14 and second processor module 15. The first processor module 14 includes a stream receiver 22, a stream determination module 23, a decoder 24, a content decryption processing module 25, a key receiver 26, a key calculation processing module 27, a host authentication processing module 28, a host key management module 29, a processor state switching module 30, and a processor state notification module 31.

The stream receiver 22 receives the contents selectively supplied from the network interface 12 and broadcasting tuner 13, namely, plaintext contents that are not encrypted or the encrypted contents, and outputs the contents to the stream determination module 23. The stream determination module 23 determines whether the contents supplied from the stream receiver 22 are the plaintext contents or the encrypted contents. The stream determination module 23 outputs the plaintext contents to the decoder 24, and outputs the encrypted contents to the content decryption processing module 25.

The decoder 24 performs the decode processing to the input plaintext contents, and outputs the plaintext contents to a video processing module 32 of the second processor module 15. The content decryption processing module 25 decrypts the input encrypted contents based on the content key generated by the key calculation processing module 27, and outputs the contents to the decoder 24. Therefore, the decode processing is performed to the contents, which are decrypted to become the plain text, and the contents are output to the second processor module 15.

In this case, the key calculation processing module 27 generates the content key by decrypting the encrypted content key, which is acquired from the data storage module 16 through the second processor module 15 by the key receiver 26. Using authentication of a public key and secret key stored in the host key management module 29, the host authentication processing module 28 performs the mutual authentication with the data storage module 16 through the second processor module 15. The key calculation processing module 27 decrypts the encrypted content key using a key (a session key), which is generated by the authentication processing and shared by the host authentication processing module 28 and the data storage module 16. Well-known techniques, such as DES and AES, may be used as a cipher algorithm used in the decryption, and there is no particular limitation to the technique.

At this point, the processor state switching module 30 selectively switches between the secure mode and the non-secure mode with respect to an operating state of the first processor module 14. That is, the software that causes the first processor module 14 to operate executes the processing while switching between the secure mode and the non-secure mode on an as-needed basis.

The processor state notification module 31 notifies various peripherals including the second processor module 15 and memory controller 18, which are connected to the first processor module 14, of the state of the first processor module 14, namely, whether the first processor module 14 is in the secure mode or the non-secure mode in the form of a signal. The processor state notification module 31 may always notify the various peripherals of the state of the first processor module 14 by transmitting the signal, or notify the various peripherals of the state of the first processor module 14 when the first processor module 14 switches from the secure mode to the non-secure mode or from the non-secure mode to the secure mode. Preferably, from the viewpoint of security, the processor state notification module 31 always notifies the various peripherals of the state of the first processor module 14.

On the other hand, the second processor module 15 includes the video processing module 32, a data access module 33, a key acquisition module 34, a key transmitter 35, a processor state management module 36, and a key acquisition determination module 37. The video processing module 32 performs predetermined video signal processing to the decoded video contents supplied from the first processor module 14, and outputs the video contents to the video image output module 17.

In response to a request from the first processor module 14, the data access module 33 accesses the data storage module 16. As a result of the access of the data access module 33 to the data storage module 16, the key acquisition module 34 acquires the encrypted content key from the data storage module 16. The key transmitter 35 transmits the encrypted content key acquired by the key acquisition module 34 to the key receiver 26 of the first processor module 14.

The processor state management module 36 receives the notification from the processor state notification module 31 of the first processor module 14, and outputs the notification to the key acquisition determination module 37. The key acquisition determination module 37 determines whether the first processor module 14 is in the secure mode or the non-secure mode using the notification from the processor state notification module 31. The key acquisition determination module 37 permits the key acquisition module 34 to acquire the encrypted content key from the data storage module 16 only when the first processor module 14 is in the secure mode. That is, the second processor module 15 accesses the protected area of the data storage module 16 to acquire the content key, and the second processor module 15 permits the transmission of the content key to the first processor module 14 only when the first processor module 14 is in the secure mode.

Figure 3:
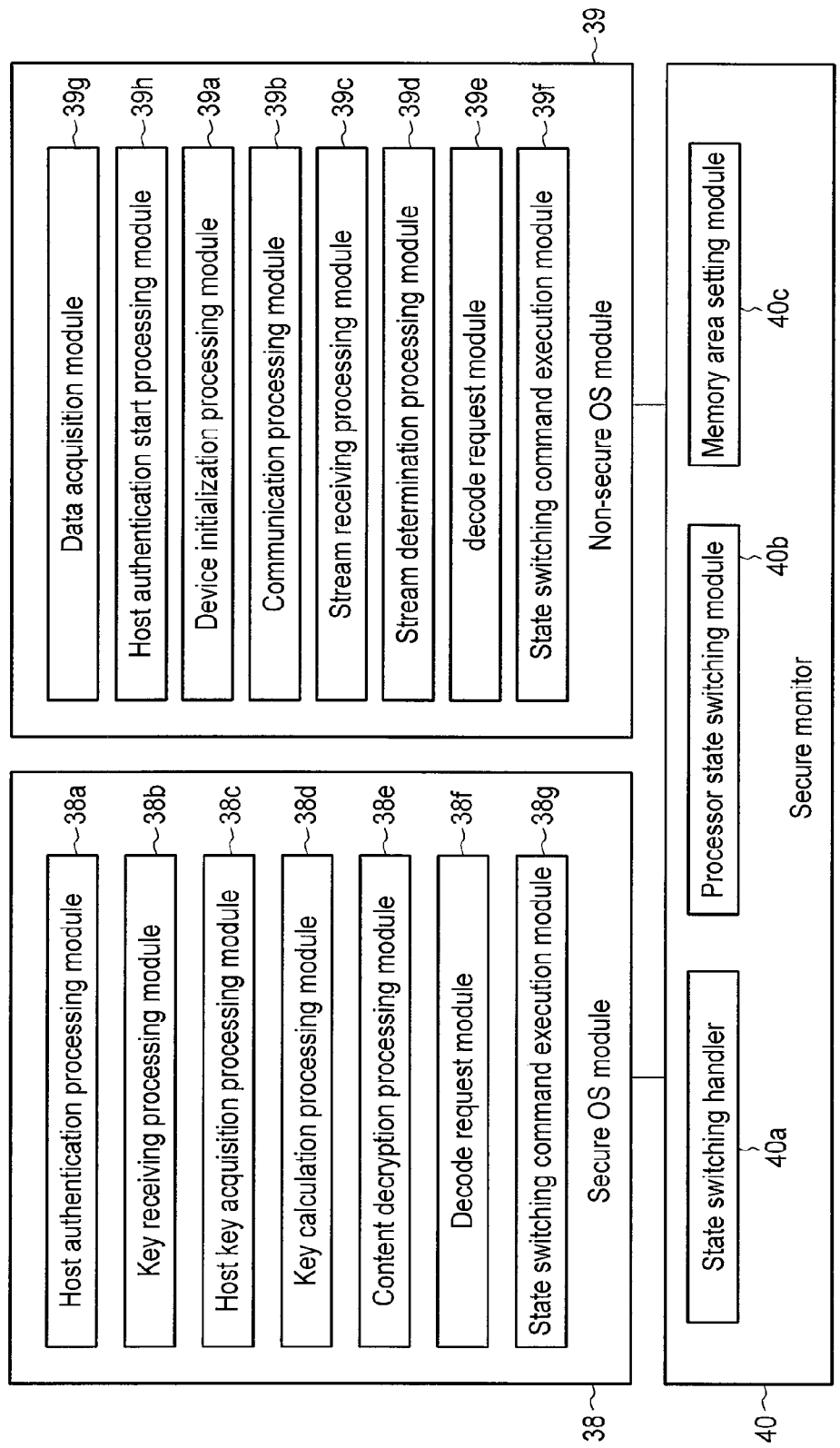
FIG. 3 is a view illustrating an example of software that causes the first processor module of the first embodiment to operate.

FIG. 3 illustrates an example of the software that causes the first processor module 14 to operate. The software is roughly divided into a secure OS module 38 that causes the first processor module 14 to operate in the secure mode, a non-secure OS module 39 that causes the first processor module 14 to operate in the non-secure mode, and a secure monitor 40 that controls the switching between the secure mode and the non-secure mode.

Necessary processing is described in each of the modules 38, 39, and 40. Each piece of processing is assumed to be an application executed on the OS, but not executed in the OS. Strictly, each piece of processing is implemented by cooperation of the application in the OS and the processing on the OS.

Applications, such as a host authentication processing module 38a that performs the processing of the host authentication processing module 28, a key receiving processing module 38b that performs the processing of the key receiver 26, a host key acquisition processing module 38c that performs the processing of the host key management module 29, a key calculation processing module 38d that performs the processing of the key calculation processing module 27, a content decryption processing module 38e that performs the processing of the content decryption processing module 25, a decode request module 38f that makes a request to the decoder 24 to perform the decode processing to the contents having a compression format, and a state switching command execution module 38g that performs processing of making a request to the processor state switching module 30 to switch the first processor module 14 from the secure mode to the non-secure mode, are executed on the secure OS module 38. The decoder 24 of the first processor module 14 may be implemented by either software or hardware. In the case that the decoder 24 is implemented by software, the decode processing is dealt with as the secure mode, namely, the application of the secure OS module 38.

Applications, such as a data acquisition module 39g that acquires the data from the network interface 12 or broadcasting tuner 13, a device initialization processing module 39a, a communication processing module 39b that conducts communication with the network interface 12, a stream receiving processing module 39c that performs the processing of the stream receiver 22, a stream determination processing module 39d that performs the processing of the stream determination module 23, a decode request module 39e that makes a request to the decoder 24 to perform the decode processing of the plaintext content having the compression format, a state switching command execution module 39f that performs the processing of making the request to the processor state switching module 30 to switch the first processor module 14 from the non-secure mode to the secure mode, and a host authentication start processing module 39h that starts the authentication processing with the data storage module 16, are executed on the non-secure OS module 39. The decoder 24 of the first processor module 14 may be implemented by either software or hardware. In the case that the decoder 24 is implemented by the software, the decode processing is processed as the secure mode, namely, the application of the non-secure OS module 39.

Applications, such as a state switching handler 40a that is of a handler when a command to switch the state of the first processor module 14 is executed, a processor state switching module 40b that switches the first processor module 14 to the non-secure mode for the first processor module 14 in the secure mode and switches the first processor module 14 to the secure mode for the first processor module 14 in the non-secure mode, and a memory area setting module 40c that divides the memory area of the memory module 19 and sets access control information stored in each area, are executed on the secure monitor 40.

Figures 4, 5:
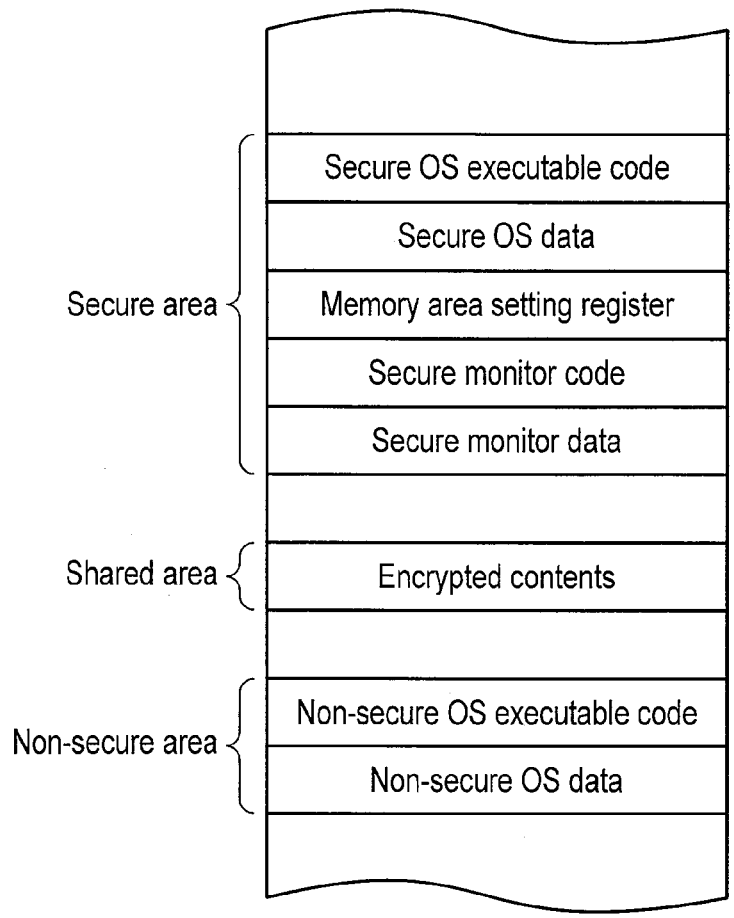
FIG. 4 is a view illustrating an example of a division of a memory module constituting the information processing device of the first embodiment into areas.
FIG. 5 is a view illustrating an example of control of access to each area of the memory module of the first embodiment.

FIG. 4 illustrates an example in which the memory area setting module 40c divides the memory area of the memory module 19. The memory area setting module 40c performs the setting of the division as part of the processing, which is performed in booting the device. That is, a secure area, a shared area, and a non-secure area are set in the memory area of the memory module 19.

A secure OS executable code, secure OS data, a memory area setting register, a secure monitor code, and secure monitor data are stored in the secure area. Encrypted contents are stored in the shared area. A non-secure OS executable code and non-secure OS data are stored in the non-secure area.

FIG. 5 illustrates availability of the access to each memory area of the memory module 19. The memory area setting module 40c performs the setting of the access control as part of the processing, which is performed in booting the device. In the case that the first processor module 14 is in the secure mode, the software running in the first processor module 14 can access the secure area, shared area, and non-secure area of the memory module 19. That is, the secure OS module 38 can access the secure area, shared area, and non-secure area of the memory module 19.

In the case that the first processor module 14 is in the non-secure mode, the software cannot access the secure area of the memory module 19, but the software can access the shared area and non-secure area of the memory module 19. That is, the non-secure OS module 39 cannot access the secure area of the memory module 19, but can access the shared area and non-secure area of the memory module 19. The access means that the data is written in or read from the memory module 19.

The memory controller 18 receives the signal indicating whether the first processor module 14 is in the secure mode or the non-secure mode from the processor state notification module 31 of the first processor module 14, and the memory controller 18 recognizes the state of the first processor module 14 to determine which memory area of the memory module 19 the first processor module 14 can access, thereby implementing the control of the access to the memory module 19.

FIG. 6 is a flowchart illustrating an example of the processing operation during initialization processing of the first processor module 14. When the device is started booting (Step S6a), the first processor module 14 reads the secure monitor code and the secure monitor data from a program storage module (not illustrated) in Step S6b, and activates the secure monitor 40 in Step S6c.

In Step S6d, the secure monitor 40 running in the first processor module 14 causes the memory area setting module 40c to divide the memory area of the memory module 19 and set the control of the access to the memory area. The first processor module 14 reads the secure OS executable code and the secure OS data from the program storage module (not illustrated) in Step S6e, and activates the secure OS module 38 in Step S6f.

The first processor module 14 loads the necessary application on the secure OS module 38 in Step S6g, and starts the application in Step S6h. Therefore, the first processor module 14 can perform the necessary processing in the secure mode. The pieces of processing in Steps S6g and S6h are repeatedly performed until the launch of the necessary application is completed to execute a state switching command to switch the state of the first processor module 14 to the non-secure mode.

The state switching command execution module 38g of the secure OS module 38 running in the first processor module 14 executes the state switching command in Step S6i. When the state switching command is executed, the first processor module 14 detects the state switching command to cause the processing to transition to the state switching handler 40a of the secure monitor 40 (Step S6j), and the state switching handler 40a executes the processor state switching module 40b of the secure monitor 40 in Step S6k. Therefore, the state of the first processor module 14 changes from the secure mode to the non-secure mode. Then the processor state switching module 40b saves the state (context) of the secure OS module 38 in the secure area of the memory module 19. The processor state switching module 40b reads the non-secure OS executable code and the non-secure OS data from the program storage module (not illustrated) in Step S6l, and starts the non-secure OS module 39 in Step S6m.

The first processor module 14 loads the necessary application on the non-secure OS module 39 in Step S6n, and launches the application in Step S6o. Therefore, the first processor module 14 can perform the necessary processing in the non-secure mode. The pieces of processing in Steps S6n and S6o are repeatedly performed until the state switching command to switch the state of the first processor module 14 to the secure mode comes.

At this point, the transition between the secure mode and the non-secure mode is performed like context switching of the OS. That is, the processor state switching module 40b of the secure monitor 40 transitions to another state while retaining (storing) the current state (context) necessary for the execution, and the processor state switching module 40b restores (loads) and executes the state (context), which is necessary for the execution and stored in the transition destination.

In the above configuration, the processor state switching module 40b of the secure monitor 40 reads the non-secure OS executable code and the non-secure OS data from the program storage module (not illustrated). Alternatively, a boot loader may read the non-secure OS executable code and the non-secure OS data from the program storage module to load the non-secure OS data from the program storage module in the non-secure area of the memory module 19 in advance of the execution of the secure monitor, or the secure OS module 38 may read the non-secure OS executable code and the non-secure OS data to load the non-secure OS executable code and the non-secure OS data in the non-secure area of the memory module 19.

FIGS. 7 and 8 are flowcharts illustrating another example of the processing operation during the initialization processing of the first processor module 14. When the first processor module 14 is started in the secure mode (Step S7a), the first processor module 14 reads the secure monitor code and the secure monitor data from the program storage module (not illustrated) in Step S7b, and starts the secure monitor 40 in Step S7c.

In Step S7d, the first processor module 14 causes the memory area setting module 40c to divide the memory area of the memory module 19 and set the control of the access to the memory area. The first processor module 14 reads the secure OS executable code and the secure OS data from the program storage module (not illustrated) in Step S7e, and starts the secure OS module 38 in Step S7f.

When the state switching command execution module 38g of the secure OS module 38 running in the first processor module 14 executes the state switching command in Step S7g, the first processor module 14 detects the state switching command to cause the processing to transition to the state switching handler 40a of the secure monitor 40 (Step S7h), and the state switching handler 40a executes the processor state switching module 40b of the secure monitor 40 in Step S7i. Therefore, the state of the first processor module 14 changes from the secure mode to the non-secure mode. Then the processor state switching module 40b saves the state (context) of the secure OS module 38 in the secure area of the memory module 19. The processor state switching module 40b reads the non-secure OS executable code and the non-secure OS data from the program storage module (not illustrated) in Step S7j, and starts the non-secure OS module 39 in Step S7k.

The first processor module 14 loads the necessary application on the non-secure OS module 39 in Step S7l, and starts the application in Step S7m. Therefore, the first processor module 14 can perform the necessary processing in the non-secure mode. The pieces of processing in Steps S7l and S7m are repeatedly performed until the state switching command execution module 39f of the non-secure OS module 39 executes the state switching command to switch the state of the first processor module 14 to the secure mode.

When the state switching command execution module 39f of the first processor module 14 executes the state switching command in Step S8a, the first processor module 14 detects the state switching command to cause the processing to transition to the state switching handler 40a of the secure monitor 40 (Step S8b), and the state switching handler 40a executes the processor state switching module 40b of the secure monitor 40 in Step S8c. Therefore, the state of the first processor module 14 changes from the non-secure mode to the secure mode. Then the processor state switching module 40b saves the state (context) of the non-secure OS module 39 in the non-secure area of the memory module 19. The processor state switching module 40b restores the state (context) of the secure OS module 38, which is stored in the secure area, to resume the secure OS module 38. The first processor module 14 loads the necessary application on the secure OS module 38 in Step S8d, and starts the application in Step S8e. For this reason, the first processor module 14 can perform the necessary processing in the secure mode. The pieces of processing in Steps S8d and S8e are repeatedly performed until the state switching command execution module 38g of the secure OS module 38 executes the state switching command to switch the state of the first processor module 14 to the non-secure mode.

When the state switching command execution module 38g of the first processor module 14 executes the state switching command in Step S8f, the first processor module 14 detects the state switching command to cause the processing to transition to the state switching handler 40a of the secure monitor 40 (Step S8g), and the state switching handler 40a executes the processor state switching module 40b of the secure monitor 40 in Step S8h. Therefore, the state of the first processor module 14 changes from the secure mode to the non-secure mode. Then the processor state switching module 40b saves the state (context) of the secure OS module 38 in the secure area of the memory module 19. The processor state switching module 40b restores the state (context) of the non-secure OS module 39, which is stored in the non-secure area, to resume the non-secure OS module 39. Then, the processing in the previous non-secure mode, namely, the pieces of processing in Steps S7l and S7m can continuously be performed in Step S8i.

According to the processing operation in FIGS. 7 and 8, unlike the processing operation in FIG. 4, the non-secure OS module 39 can advantageously be booted at high speed without loading and starting the application on the secure OS module 38 after the secure OS module 38 is started in Step S7f.

FIG. 9 illustrates an example of the data storage module 16. The data storage module 16 includes a user area module 41, a protected area module 42, and a controller module 43. The user area module 41 is an area that can freely be accessed with no access restriction from the outside of the data storage module 16 to write and read the data. For example, the encrypted contents are recorded in the user area module 41.

The protected area module 42 is a protective area in the data storage module 16, and is an area that can be accessed only from the device that successfully performs the mutual authentication with the data storage module 16. The protected area module 42 includes a content key storage module 42a in which a plaintext content key is stored.

The controller module 43 includes a command type determination module 43a, an access controller 43b, a card authentication processing module 43c, an authentication key storage module 43d, and a key encryption module 43e. The command type determination module 43a determines an access command supplied from an external device (in this case, the data access module 33 of the second processor module 15). The command type determination module 43a directly permits the access command when the access command is the access to the user area module 41, and the command type determination module 43a acts to perform the mutual authentication processing when the access command is the access to the protected area module 42.

The card authentication processing module 43c performs the mutual authentication with the first processor module 14 through the second processor module 15 using authentication public key and secret key, which are stored in the authentication key storage module 43d. The access controller 43b permits the access to the protected area module 42 only when the mutual authentication is successfully performed between the card authentication processing module 43c and the first processor module 14.

When the authentication is successfully performed to permit the access to the protected area module 42, the key encryption module 43e reads the content key from the content key storage module 42a of the protected area module 42, and encrypts the content key using the key (the session key), which is generated by the authentication processing and shared by the first processor module 14 and the card authentication processing module 43c. The encrypted content key is output to and acquired by the key acquisition module 34 of the second processor module 15.

Figure 11:
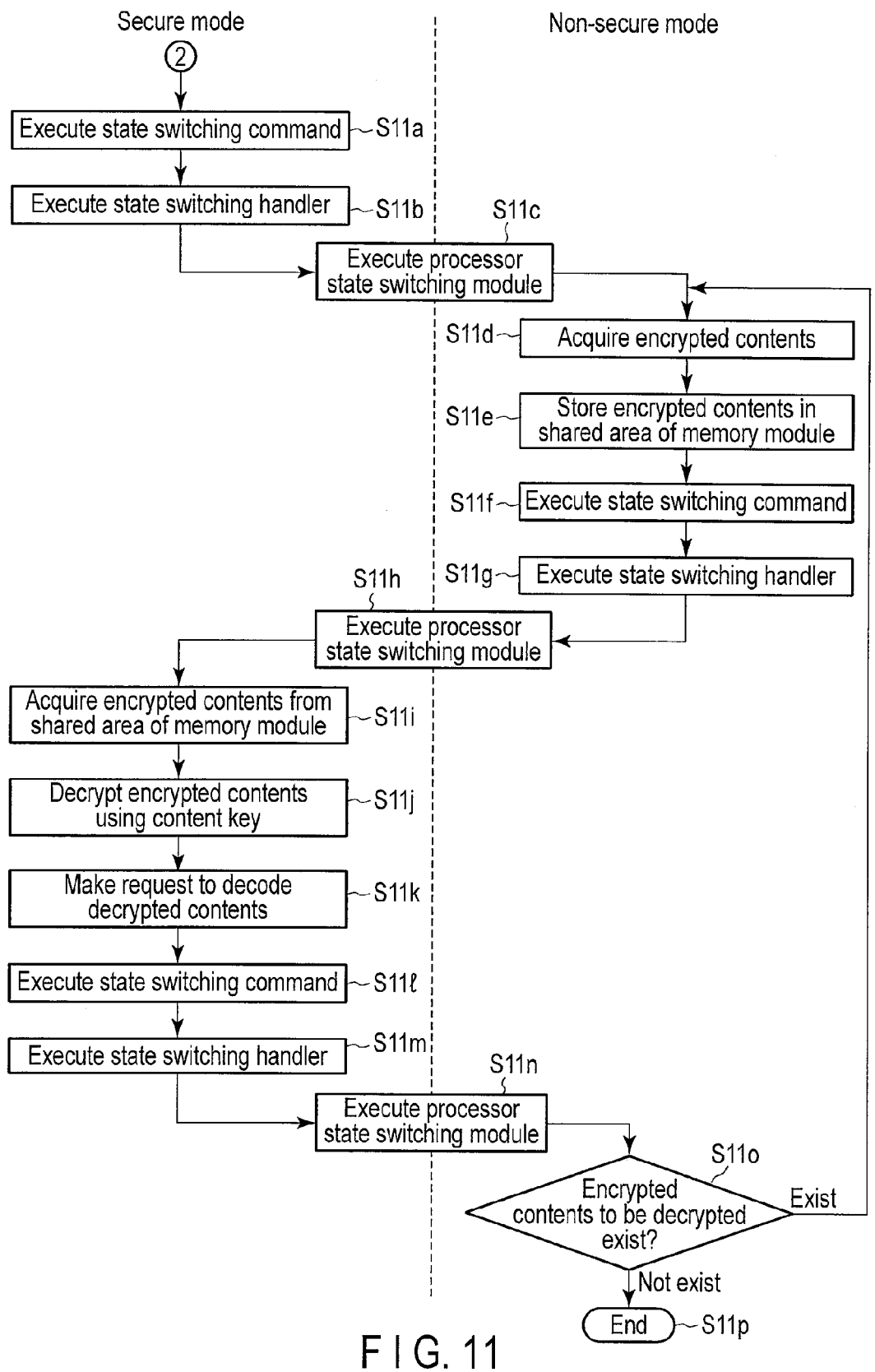
FIG. 11 is a flowchart illustrating the rest of an example of the processing operation in which the first processor module of the first embodiment decrypts the encrypted content.

FIGS. 10 and 11 are a flowchart illustrating an example of the processing operation in which the first processor module 14 decrypts the encrypted contents stored in the user area module 41 of the data storage module 16 using the content key stored in the content key storage module 42a of the data storage module 16.

The processing in FIGS. 10 and 11 is started when the user selects desired contents while the first processor module 14 is in the non-secure mode (Step S10a). For example, the contents can be selected on the browser running on the first processor module 14. Even if the browser has a security vulnerability, a leakage of the key used in the authentication or information alteration of the authentication processing is prevented because the authentication processing is performed in the secure mode.

It is necessary that the processing of calculating the content key be performed while the first processor module 14 is in the secure mode. Therefore, the host authentication start processing module 39h of the first processor module 14 receives the command to start the authentication processing with the data storage module 16 from the software, such as the browser in Step S10b, and the host authentication start processing module 39h executes the state switching command using the state switching command execution module 39f in order to switch the state of the first processor module 14 in Step S10c. As described above, the first processor module 14 detects the state switching command to cause the processing to transition to the state switching handler 40a of the secure monitor 40 (Step S10d), and the state switching handler 40a executes the processor state switching module 40b of the secure monitor 40 in Step S10e.

Therefore, the first processor module 14 transitions to the secure mode, and the secure OS module 38 performs the authentication processing with the data storage module 16 in the secure mode in Step S10f. The authentication processing is described in detail later.

In Step S10g, the host authentication processing module 38a of the first processor module 14 determines whether the authentication is successfully performed. When the host authentication processing module 38a determines the failure in the authentication, the processing of acquiring the encrypted content key from the data storage module 16 is not performed after that, the state switching command is executed using the state switching command execution module 38g in Step S10h, the processing is caused to transition to the state switching handler 40a of the secure monitor 40 in Step S10i, the state switching handler 40a executes the processor state switching module 40b of the secure monitor 40 to switch the state of the first processor module 14 to the non-secure mode in Step S10j, and error processing is performed in Step S10k.

When the host authentication processing module 38a determines that the authentication is successfully performed in Step S10g, the first processor module 14 transmits a request to acquire the encrypted content key to the data storage module 16 through the second processor module 15 in Step S10l. In Step S10m, the first processor module 14 acquires the encrypted content key, which is transmitted from the data storage module 16, through the second processor module 15.

In Step S10n, the first processor module 14 decrypts the encrypted content key using the session key generated by the authentication processing, thereby acquiring the plaintext content key. The first processor module 14 executes the state switching command using the state switching command execution module 38g in Step S11a, the first processor module 14 causes the processing to transition to the state switching handler 40a of the secure monitor 40 in Step S11b, and the state switching handler 40a executes the processor state switching module 40b of the secure monitor 40 to switch the state of the first processor module 14 to the non-secure mode in Step S11c.

In the non-secure mode, the data acquisition module 39g of the first processor module 14 acquires the encrypted contents stored in the user area module 41 of the data storage module 16 through the second processor module 15 in Step S11d, and the data acquisition module 39g stores the acquired encrypted contents in the shared area of the memory module 19 in Step S11e.

The first processor module 14 executes the state switching command using the state switching command execution module 39f in Step S11f, the first processor module 14 causes the processing to transition to the state switching handler 40a of the secure monitor 40 in Step S11g, and the state switching handler 40a executes the processor state switching module 40b of the secure monitor 40 to switch the state of the first processor module 14 to the secure mode in Step S11h.

In the secure mode, the first processor module 14 acquires the encrypted contents from the shared area of the memory module 19 in Step S11i, decrypts the acquired encrypted contents using the decrypted content key in Step S11j, and causes the decode request module 38f to execute the decode request to decode the decrypted contents in Step S11k. The decoder 24 performs the decode processing to the decrypted contents upon the decode request, and outputs the contents to the video processing module 32 of the second processor module 15.

The first processor module 14 executes the state switching command using the state switching command execution module 38g in Step S11l, the first processor module 14 causes the processing to transition to the state switching handler 40a of the secure monitor 40 in Step S11m, and the state switching handler 40a executes the processor state switching module 40b of the secure monitor 40 to switch the state of the first processor module 14 to the non-secure mode in Step S11n.

In the non-secure mode, the first processor module 14 determines whether the encrypted contents to be decrypted exist in Step S11o. The first processor module 14 goes to the processing in Step S11d when the encrypted contents to be decrypted exist, and the first processor module 14 ends the processing (Step S11p) when the encrypted contents to be decrypted do not exist.

Figure 12:
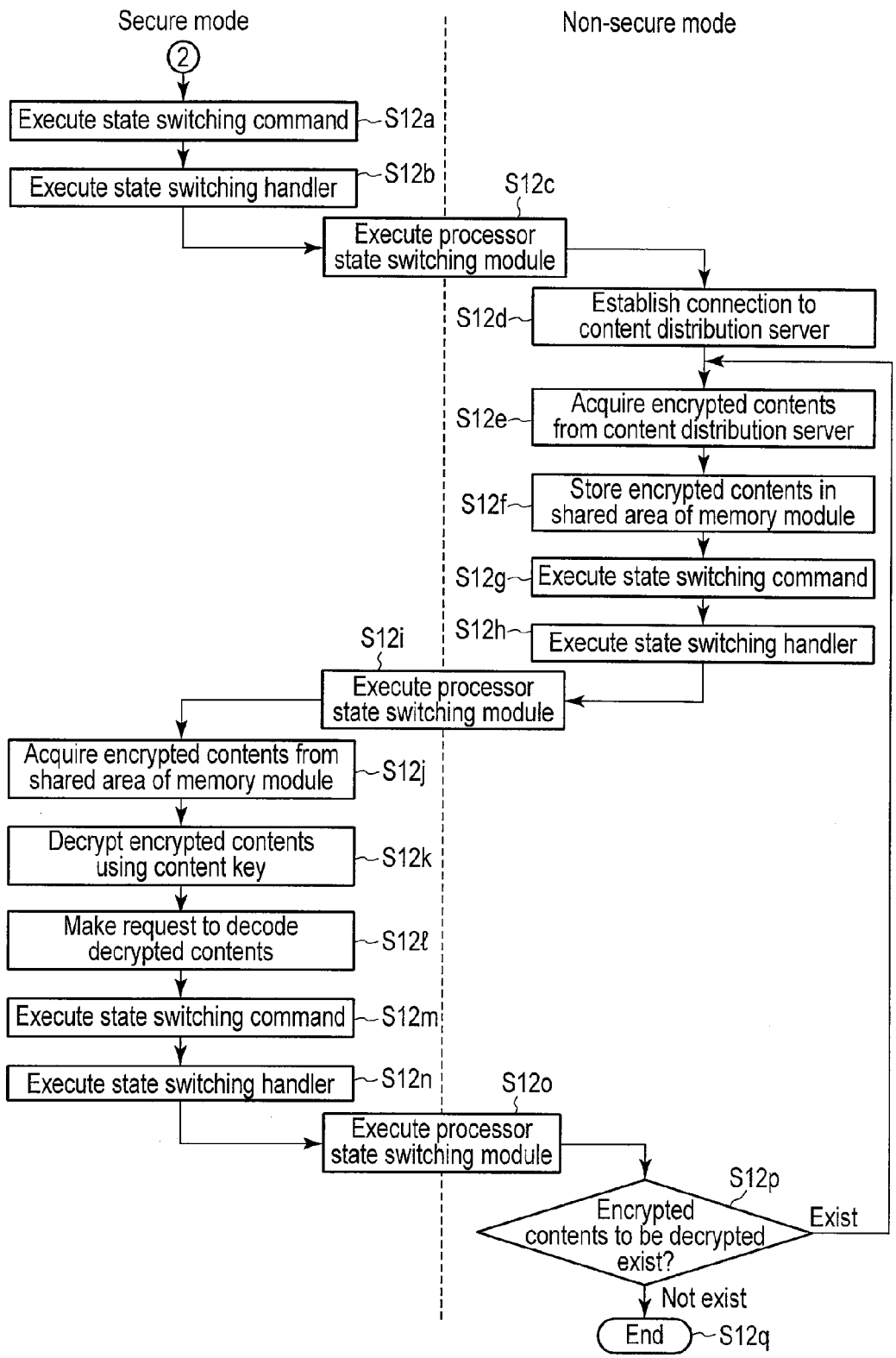
FIG. 12 is a flowchart illustrating another example of the processing operation in which the first processor module of the first embodiment decrypts the encrypted content.

FIG. 12 is a flowchart illustrating another example of the processing operation in which the first processor module 14 decrypts the encrypted content using the content key. In FIG. 12, it is assumed that the encrypted content to be decrypted is acquired from the content distribution server 20.

After the encrypted content key is decrypted to acquire the plaintext content key in Step S10n in FIG. 10, the first processor module 14 executes the state switching command using the state switching command execution module 38g in Step S12a, the first processor module 14 causes the processing to transition to the state switching handler 40a of the secure monitor 40 in Step S12b, and the state switching handler 40a executes the processor state switching module 40b of the secure monitor 40 to switch the state of the first processor module 14 to the non-secure mode in Step S12c.

In the non-secure mode, the first processor module 14 establishes connection with the content distribution server 20 through the network interface 12 in Step S12d, acquires the encrypted contents from the content distribution server 20 in Step S12e, and stores the acquired encrypted contents in the shared area of the memory module 19 in Step S12f.

The first processor module 14 executes the state switching command using the state switching command execution module 39f in Step S12g, the first processor module 14 causes the processing to transition to the state switching handler 40a of the secure monitor 40 in Step S12h, and the state switching handler 40a executes the processor state switching module 40b of the secure monitor 40 to switch the state of the first processor module 14 to the secure mode in Step S12i.

In the secure mode, the first processor module 14 acquires the encrypted contents from the shared area of the memory module 19 in Step S12j, decrypts the acquired encrypted contents using the decrypted content key in Step S12k, and causes the decode request module 38f to execute the decode request to decode the decrypted contents in Step S12l. The decoder 24 performs the decode processing to the decrypted contents upon the decode request, and outputs the contents to the video processing module 32 of the second processor module 15.

The first processor module 14 executes the state switching command using the state switching command execution module 38g in Step S12m, the first processor module 14 causes the processing to transition to the state switching handler 40a of the secure monitor 40 in Step S12n, and the state switching handler 40a executes the processor state switching module 40b of the secure monitor 40 to switch the state of the first processor module 14 to the non-secure mode in Step S12o.

In the non-secure mode, the first processor module 14 determines whether the encrypted contents to be decrypted exist in Step S12p. The first processor module 14 goes to the processing in Step S12e when the encrypted contents to be decrypted exist, and the first processor module 14 ends the processing (Step S12q) when the encrypted contents to be decrypted do not exist.

Figure 33:
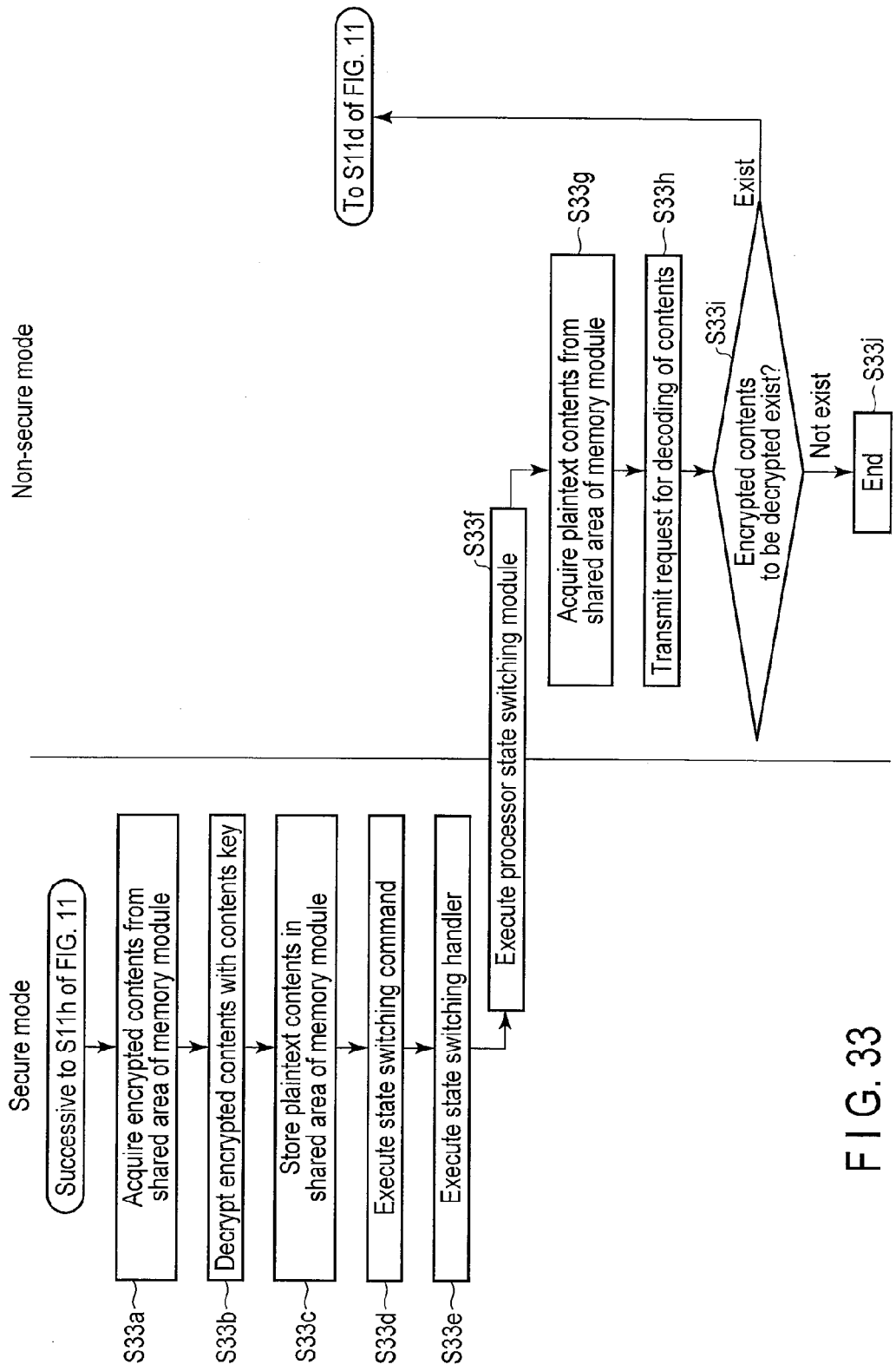
FIG. 33 is a flowchart illustrating still another example of the processing operation in which the first processor module of the first embodiment decrypts the encrypted content.

As described above, the encrypted content decrypting processing and the plaintext content decoding processing are performed in the secure mode. Alternatively, only the encrypted content decrypting processing may be performed in the secure mode while the plaintext content decoding processing is performed in the non-secure mode. FIG. 33 is a flowchart illustrating an example of the processing operation in this case.

The same pieces of processing as those in Step S11j in FIG. 11 are performed to Step S33b. That is, when the encrypted contents are decrypted, the decrypted plaintext contents are stored in the shared area of the memory module 19 (Step S33c).

The first processor module 14 executes the state switching command using the state switching command execution module 38g in Step S33d, the first processor module 14 causes the processing to transition to the state switching handler 40a of the secure monitor 40 in Step S33e, and the state switching handler 40a executes the processor state switching module 40b of the secure monitor 40 to switch the state of the first processor module 14 to the non-secure mode in Step S33f.

In the non-secure mode, the first processor module 14 acquires the plaintext contents from the shared area of the memory module 19 in Step S33g, and causes the decode request module 38f to execute the decode request to decode the plaintext contents in Step S33h. The decoder 24 performs the decode processing to the decrypted contents upon the decode request, and outputs the contents to the video processing module 32 of the second processor module 15.

In Step S33i, the first processor module 14 determines whether the encrypted contents to be decrypted exist. The first processor module 14 goes to the processing in Step S11d when the encrypted contents to be decrypted exist, and the first processor module 14 ends the processing (Step S33j) when the encrypted contents to be decrypted do not exist.

The same pieces of processing may be applied to the processing operation in FIG. 12.

The non-secure OS module 39 includes the decode request module 39e because the information processing device 11 needs to decode the copyright-free plaintext contents input from the network, the broadcasting wave, or the storage device. In the configuration, the decode request processing is not performed in the secure mode, so that the decode request processing can be consolidated in the non-secure OS module 39. Therefore, the decode request module 38f of the secure OS module 38 is eliminated, and the configuration of the secure OS module 38 can be simplified.

Figure 13:
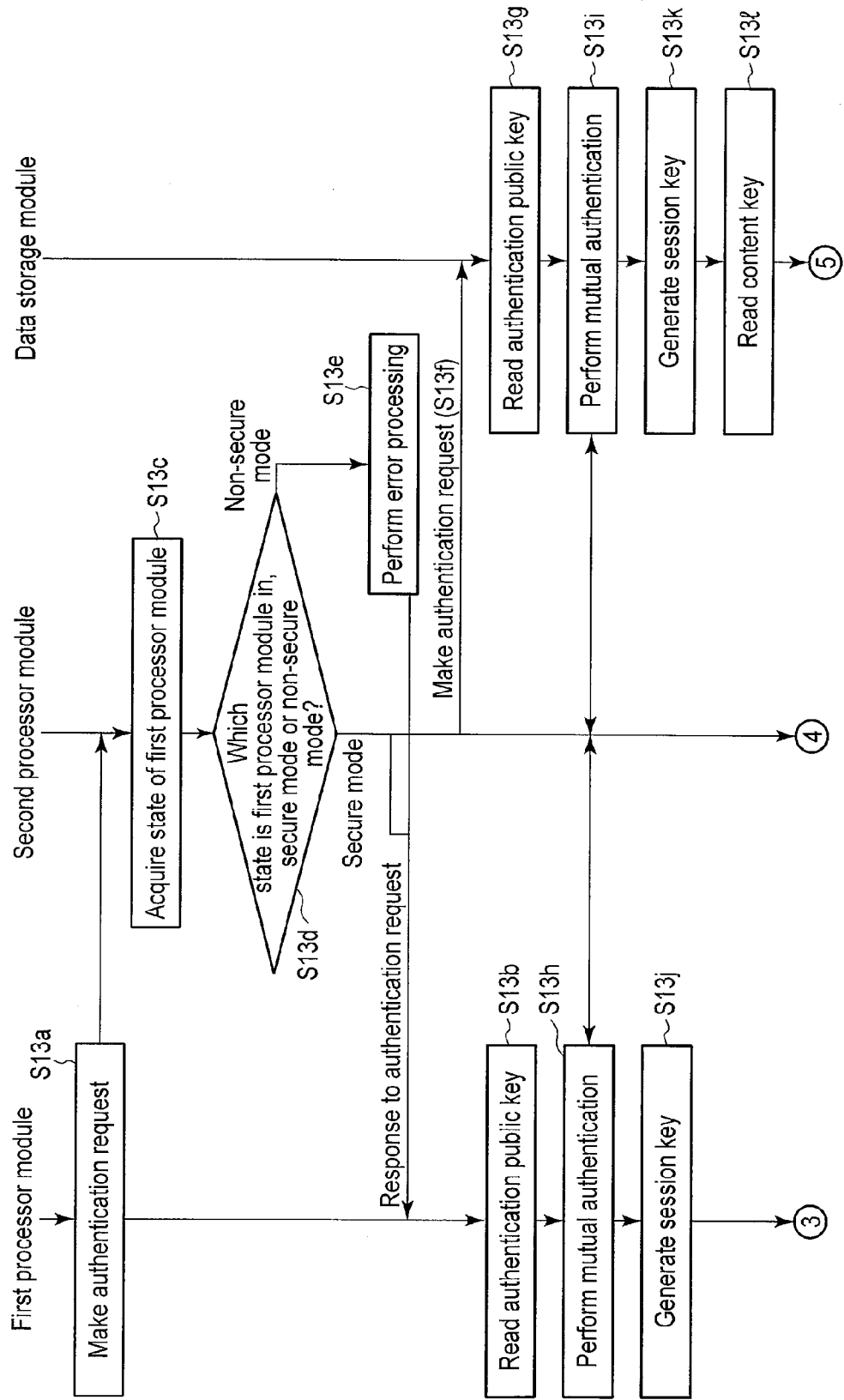
FIG. 13 is a flowchart illustrating part of an example of a processing operation in which the first processor module of the first embodiment acquires a content key from a protected area.
Figure 14:
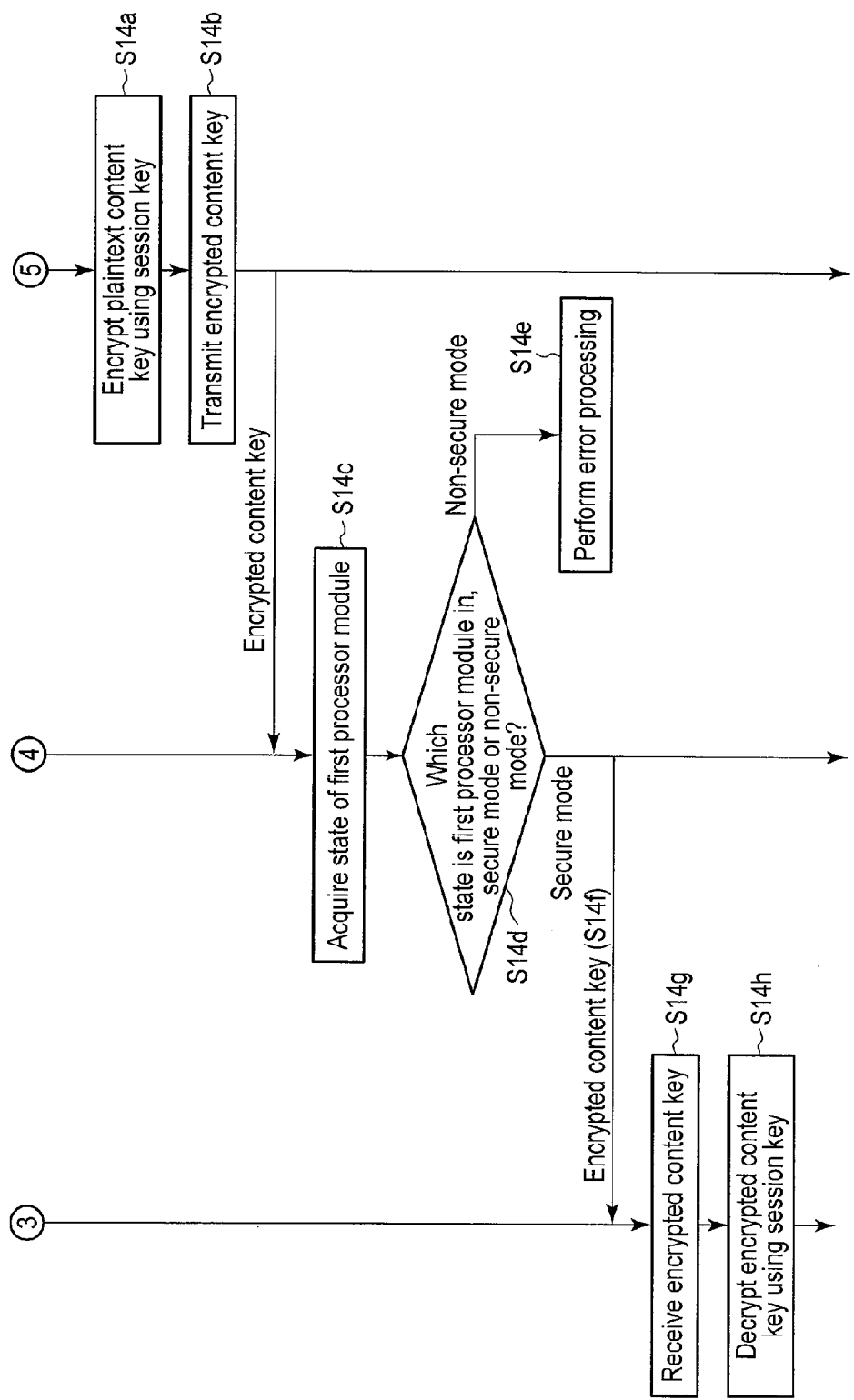
FIG. 14 is a flowchart illustrating the rest of an example of the processing operation in which the first processor module of the first embodiment acquires the content key from the protected area.

FIGS. 13 and 14 are a flowchart illustrating an example of the processing operation in which the first processor module 14 performs the authentication with the data storage module 16 to acquire the content key stored in the protected area module 42 of the data storage module 16.

In Step S13a, the first processor module 14 makes an authentication request to the second processor module 15, thereby starting the processing operation. When the second processor module 15 sends back reception of the request in response to the authentication request, in the first processor module 14, the host authentication processing module 28 reads the authentication public key stored in the host key management module 29 in Step S13b. When an error response is received as the response to the authentication request, the subsequent processing is not performed.

On the other hand, in Step S13d, the second processor module 15 determines whether the first processor module 14 is in the secure mode or the non-secure mode based on the state of the first processor module 14, which is acquired by the processor state management module 36 in Step S13c. When the first processor module 14 is in the non-secure mode, namely, when the non-secure OS module 39 runs on the first processor module 14, the second processor module 15 performs error processing (for example, the processing of cutting the session with the data storage module 16) in Step S13e.

When the first processor module 14 is determined to be in the secure mode in Step S13d, namely, when the secure OS module 38 runs on the first processor module 14, the second processor module 15 makes an authentication request to the data storage module 16 in Step S13f. In the data storage module 16, the card authentication processing module 43c reads the authentication public key stored in the authentication key storage module 43d in Step S13g.

Therefore, the mutual authentication is performed through the second processor module 15 by the first processor module 14 in Step S13h and by the data storage module 16 in Step S13i. Well-known public key algorithms, such as an RSA and an elliptic curve cryptosystem, are used as an authentication algorithm. When the mutual authentication is successfully performed, the first processor module 14 generates the session key based on the authentication processing in Step S13j, and the second processor module 15 generates the session key based on the authentication processing in Step S13k.

The second processor module 15 reads the plaintext content key from the content key storage module 42a of the protected area module 42 in Step S13l, encrypts the plaintext content key using the session key in Step S14a, and transmits the encrypted content key to the second processor module 15 in Step S14b. The key acquisition module 34 acquires the encrypted content key transmitted to the second processor module 15.

In Step S14d, the second processor module 15 determines whether the first processor module 14 is in the secure mode or the non-secure mode based on the state of the first processor module 14, which is acquired by the processor state management module 36 in Step S14c. When the first processor module 14 is in the non-secure mode, namely, when the non-secure OS module 39 runs on the first processor module 14, the second processor module 15 performs the error processing (for example, the processing of cutting the session with the data storage module 16) in Step S14e.

When the first processor module 14 is determined to be in the secure mode in Step S14d, namely, when the secure OS module 38 runs on the first processor module 14, the second processor module 15 transmits the encrypted content key acquired by the key acquisition module 34 to the first processor module 14 through the key transmitter 35 in Step S14f.

In the first processor module 14, the key receiver 26 receives the encrypted content key supplied from the second processor module 15 in Step S14g, and the key calculation processing module 27 decrypts the encrypted content key using the session key in Step S14h. Therefore, the first processor module 14 can acquire the content key stored in the protected area module 42 of the data storage module 16.

As described above, the processing of checking the state of the first processor module 14 is performed when the second processor module 15 receives the authentication request from the first processor module 14 and when the second processor module 15 transmits the encrypted content key to the first processor module 14. Alternatively, because the second processor module 15 always monitors the state of the first processor module 14, the authentication processing and the processing of transmitting the encrypted content key may be interrupted when the signal output from the processor state notification module 31 of the first processor module 14 becomes the non-secure mode, namely, when the processor state management module 36 of the second processor module 15 detects that the state of the first processor module 14 is in the non-secure mode.

According to the first embodiment, the data transmission between the first processor module 14 and the data storage module 16 is performed through the second processor module 15, and the second processor module 15 permits the first processor module 14 to access the protected area module 42 of the data storage module 16 only when the first processor module 14 is in the secure mode. That is, the software permitted to access the protected area module 42 of the data storage module 16 is restricted to the secure OS module 38 and the application running on the secure OS module 38, and the non-secure OS module 39 and the application running on the non-secure OS module 39 can be prohibited from accessing the protected area module 42. Unreliable software is prevented from acquiring the content key stored in the protected area module 42 of the data storage module 16, and therefore the illegal acquisition of the contents can be prevented.

The key calculation processing module 27 of the first processor module 14 deals with not only the secret information that is of the content key but also pieces of verification processing, such as MAC (Message Authentication Code), namely, processing in which the secret information is not dealt with but falsification, such as a skip of the processing, should be prohibited. The MAC verification processing is performed in the secure mode, namely, on the secure OS module 38. As described above, the memory areas of the secure OS module 38 and non-secure OS module 39 are separated by the memory controller 18, and the access to the memory area managed by the secure OS module 38 is prohibited even if any piece of processing can be performed or the access to any memory area is obtained due to the existence of the vulnerability in the application of the non-secure OS module 39 or the OS itself. Therefore, the MAC verification processing is not skipped and the calculation result of the MAC is not falsified, but the MAC verification processing can sufficiently be protected.

The second processor module 15 checks that the first processor module 14 is in the secure mode when not only the first processor module 14 makes the authentication request but also the encrypted content key is transmitted to the first processor module 14. Therefore, the application running on the non-secure OS module 39 or non-secure OS module 39 can be prevented from illegally acquiring the content key.

FIG. 15 illustrates a modification of the second processor module 15. In FIG. 15, the same module as that in FIG. 2 is designated by the same numeral. The second processor module 15 in FIG. 15 differs from that in FIG. 2 in that a data access determination module 44 is added. The data access determination module 44 determines whether the first processor module 14 is in the secure mode or the non-secure mode using the notification from the processor state notification module 31, which is received by the processor state management module 36. The data access determination module 44 permits the data access module 33 to acquire the encrypted contents from the user area module 41 of the data storage module 16 only when first processor module 14 is in the non-secure mode.

FIG. 16 is a flowchart illustrating an example of the processing operation in which the first processor module 14 acquires the encrypted contents stored in the user area module 41 of the data storage module 16. In Step S16a, the first processor module 14 makes the authentication request to the second processor module 15 to acquire the encrypted contents, thereby starting the processing operation.

In Step S16c, the second processor module 15 determines whether the first processor module 14 is in the secure mode or the non-secure mode based on the state of the first processor module 14, which is acquired by the processor state management module 36 in Step S16b. When the first processor module 14 is in the secure mode, the second processor module 15 performs the error processing (for example, the processing of rejecting the data transfer from the data storage module 16) in Step S16d.

When determining that the first processor module 14 is in the non-secure mode in Step S16c, the second processor module 15 makes the request to the data storage module 16 to acquire the encrypted contents in Step S16e. The data storage module 16 reads the encrypted contents from the user area module 41 in Step S16f, and transmits the encrypted contents to the second processor module 15 in Step S16g. The data access module 33 acquires the encrypted contents transmitted to the second processor module 15.

In Step S16h, the second processor module 15 transmits the encrypted contents to the first processor module 14. Therefore, the first processor module 14 can acquire the encrypted contents stored in the user area module 41 of the data storage module 16.

That is, the second processor module 15 accesses the user area module 41 of the data storage module 16 to acquire the encrypted contents, and the second processor module 15 permits the transmission of the encrypted contents to the first processor module 14 only when the first processor module 14 is in the non-secure mode. Therefore, the secure OS module 38 can be prevented from constructing all the pieces of processing performed by the first processor module 14.

When the secure OS module 38 constructs all the pieces of processing performed by the first processor module 14, a software size is enlarged, which increases the risk of the vulnerability. Originally, the processing in which the secret information is not dealt with and the processing in which the verification of the falsification is not required are constructed by the non-secure OS module 39, which allows the size increase and the vulnerability increase to be prevented in the software executed by the secure OS module 38.

On the other hand, in the non-secure OS module 39, the software size is enlarged, which increases the risk of the vulnerability because pieces of processing, such as network communication processing, browser processing, and data acquisition processing, which exclude the processing performed by the non-secure OS module 39, are constructed. However, the data or processing, which is dealt with by the secure OS module 38, cannot be changed even if any piece of processing can be performed or the access to any memory area is obtained due to the existence of the vulnerability in the non-secure OS module 39 or the application processed on the non-secure OS module 39. Therefore, the system can safely be constructed.

In the above example, the necessity for the first processor module 14 to be operated in the non-secure mode is provided in order to acquire the encrypted contents. Thus, the second processor module 15 that transmits the encrypted content key can easily check whether the operating system executed on the first processor module 14 is separately constructed by a portion in which the first processor module 14 is operated in the secure mode and a portion in which the first processor module 14 is operated in the non-secure mode.

Alternatively, the second processor module 15 recognizes the area in which the encrypted contents are stored and the area in which contents except the encrypted contents are stored in the user area module 41 of the data storage module 16, and the second processor module 15 may determine whether the first processor module 14 is in the non-secure mode only upon the request to acquire the encrypted contents.

Figures 17, 18:
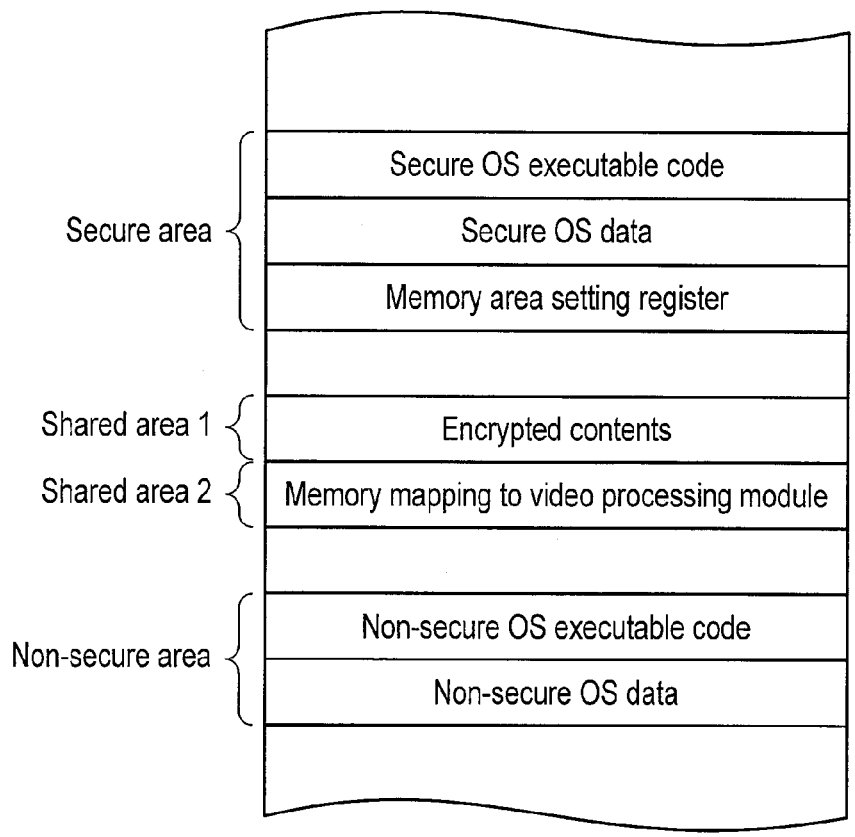
FIG. 17 is a view illustrating another example of the division of the memory module into areas.
FIG. 18 is a view illustrating another example of the control of the access to each area of the memory module of the first embodiment.

FIG. 17 illustrates another example in which the memory area of the memory module 19 is divided. That is, the secure area, a shared area 1, a shared area 2, and the non-secure area are set in the memory area of the memory module 19.

The secure OS executable code, the secure OS data, and the memory area setting register are stored in the secure area. The encrypted contents are stored in the shared area 1, and memory mapping is performed to the video processing module 32 in the shared area 2. The non-secure OS executable code and the non-secure OS data are stored in the non-secure area. As used herein, the memory mapping performed to the video processing module 32 means one in which, when the decoder 24 transmits a base-band video signal to the video processing module 32, an input to the video processing module 32 is regarded as a memory such that the data can be transmitted at high speed, and the base-band video signal is written in the memory.

FIG. 18 illustrates the availability of the access to each memory area of the memory module 19 in FIG. 17. In the case that the first processor module 14 is in the secure mode, the access to the secure area, shared areas 1 and 2, and non-secure area of the memory module 19 can be obtained.

In the case that the first processor module 14 is in the non-secure mode, read access to the secure area and shared area 2 of the memory module 19 cannot be obtained, but read access to the shared area 1 and non-secure area of the memory module 19 can be obtained.

In the case that the first processor module 14 is in the non-secure mode, write access to the secure area of the memory module 19 cannot be obtained, but write access to the shared areas 1 and 2 and non-secure area of the memory module 19 can be obtained.

Both the write access and the read access are permitted for the shared area 1. That is, the write access is required to store the encrypted contents acquired in the non-secure mode in the shared area 1 of the memory module 19, and the read access is also permitted because there is no problem for software running in the non-secure mode to read encrypted content.

On the other hand, for the shared area 2, the write access is permitted in the non-secure mode while the read access is prohibited. The baseband video signal is written in the video processing module 32 after the decode processing, and sometimes the plaintext contents are decoded in the non-secure mode and written in the video processing module 32. Therefore, it is necessary to permit the write access in the non-secure mode. However, in the case that the encrypted contents of the protection target are decrypted, decoded, and written in the video processing module 32 in the non-secure mode, because the contents written in the secure mode are originally the encrypted contents of the protection target, it is problematic to read the contents in the non-secure mode. Therefore, the read access in the non-secure mode is prohibited.

A second embodiment will be described below. FIG. 19 schematically illustrates a signal processing system of an information processing device 11 of the second embodiment. In FIG. 19, the same module as that in FIG. 1 is designated by the same numeral. The information processing device 11 of the second embodiment differs from that of the first embodiment first in that a first program storage module 45 and a second program storage module 46 are added.

A program (boot loader) during the boot of a first processor module 14 is stored in the first program storage module 45. For example, the first program storage module 45 is assumed to be a flash memory or a ROM (Read Only Memory). A non-secure OS module 39 executed on the first processor module 14 and a program executed on the non-secure OS module 39 are stored in the second program storage module 46. For example, the second program storage module 46 is assumed to be a flash memory. A certificate, in which a hash value of a first program is signed with the secret key, is attached to a first program (the boot loader) stored in the first program storage module 45. A certificate, in which a hash value of a second program is signed with the secret key, is attached to a second program (the non-secure OS module 39) stored in the second program storage module 46. The secret keys used in signature calculations of the first program and second program may be identical to or different from each other. In the following description, it is assumed that the secret keys are different from each other. Well-known hash algorithms, such as MD5 and SHA1, are used as a hash value algorithm. Well-known public key algorithms, such as the RSA and the elliptic curve cryptosystem, are used as a signature algorithm.

FIG. 20 illustrates an example of the first processor module 14. In FIG. 20, the same module as that in FIG. 2 is designated by the same numeral. The first processor module 14 in FIG. 20 differs from that in FIG. 2 in that a program verification module 47, a verification-module key management module 48, and a program execution module 49 are added.

The program verification module 47 performs verification processing of inspecting whether the first program (the boot loader) loaded from the first program storage module 45 is falsified using a verification key stored in the verification-module key management module 48. The program execution module 49 executes the successfully-verified first program. At this point, the second program is loaded from the second program storage module 46 by the first program. The program verification module 47 performs verification processing of inspecting whether the second program loaded from the second program storage module 46 is falsified using the verification key included in the successfully-verified first program. Then the program execution module 49 executes the successfully-verified second program.

Figure 21:
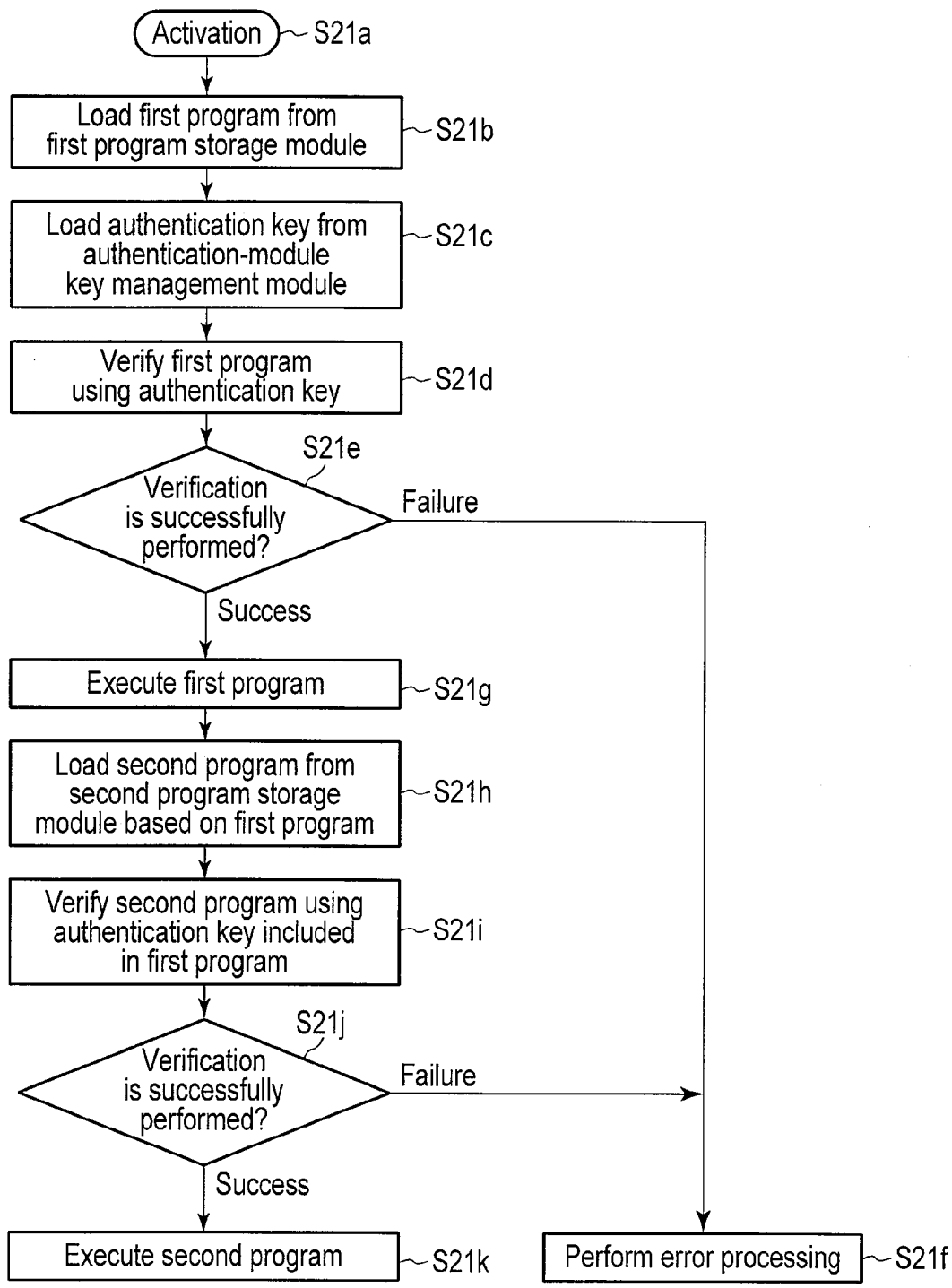
FIG. 21 is a flowchart illustrating an example of a processing operation in which the first processor module of the second embodiment loads and verifies a program.

FIG. 21 is a flowchart illustrating an example of the processing operation, in which the first processor module 14 loads the first and second programs from the first and second program storage modules 45 and 46 and verifies the first and second programs. When being booted (Step S21a), the first processor module 14 loads the first program from the first program storage module 45 in Step S21b.

In Step S21c, the first processor module 14 loads the verification key (the public key) stored in the verification-module key management module 48. The first processor module 14 verifies the first program using the verification key in Step S21d, and determines whether the verification processing is successfully performed in Step S21e. When determining the failure in the verification processing, the first processor module 14 performs the error processing in Step S21f. Specifically, the first processor module 14 calculates the hash value of the first program, determines whether the hash value included in the certificate attached to the first program is equal to the calculated hash value, and checks whether the signature included in the certificate can successfully be verified using the verification key. The verification is assumed to be successful when the checking is successfully made.

In the second embodiment, the certificate is attached to the first program by way of example. In the case that while contents of the first program cannot physically be overwritten the first program storage module 45 is constructed by the ROM, because there is no risk of illegitimately modifying the contents of the first program, the first processor module 14 need not perform the first program verification processing nor attach the certificate to the first program. In case the contents of the first program are mistakenly written in the ROM, the hash value of the first program may be attached to the first program to perform the processing of inspecting whether the hash values are equal to each other during the boot.

When determining that the verification processing is successfully performed in Step S21e, the first processor module 14 executes the first program in Step S21g, and loads the second program from the second program storage module 46 based on the first program in Step S21h.

The first processor module 14 verifies the second program using the verification key (the public key) included in the first program in Step S21i, and determines whether the verification processing is successfully performed in Step S21j. The first processor module 14 performs the error processing in Step S21f when determining the failure in the verification processing, and the first processor module 14 performs the second program in Step S21k when determining that the verification processing is successfully performed. The verification key used to verify the second program is included in the first program, but also the verification key may be stored in the verification-module key management module 48.

In the above configuration, the boot loader is stored in the first program storage module 45, and the non-secure OS module 39 executed on the first processor module 14 and the program executed on the non-secure OS module 39 are stored in the second program storage module 46. In the following description, a secure monitor 40 including the boot loader is stored in the first program storage module 45, the non-secure OS module 39 executed on the first processor module 14 and the program executed on the non-secure OS module 39 are stored in the second program storage module 46, a secure OS module 38 and a program executed on the secure OS module 38 are stored in a data storage module 16, and the boot loader, a monitor program, the secure OS module 38, and the non-secure OS module 39 are sequentially booted.

Figure 22:
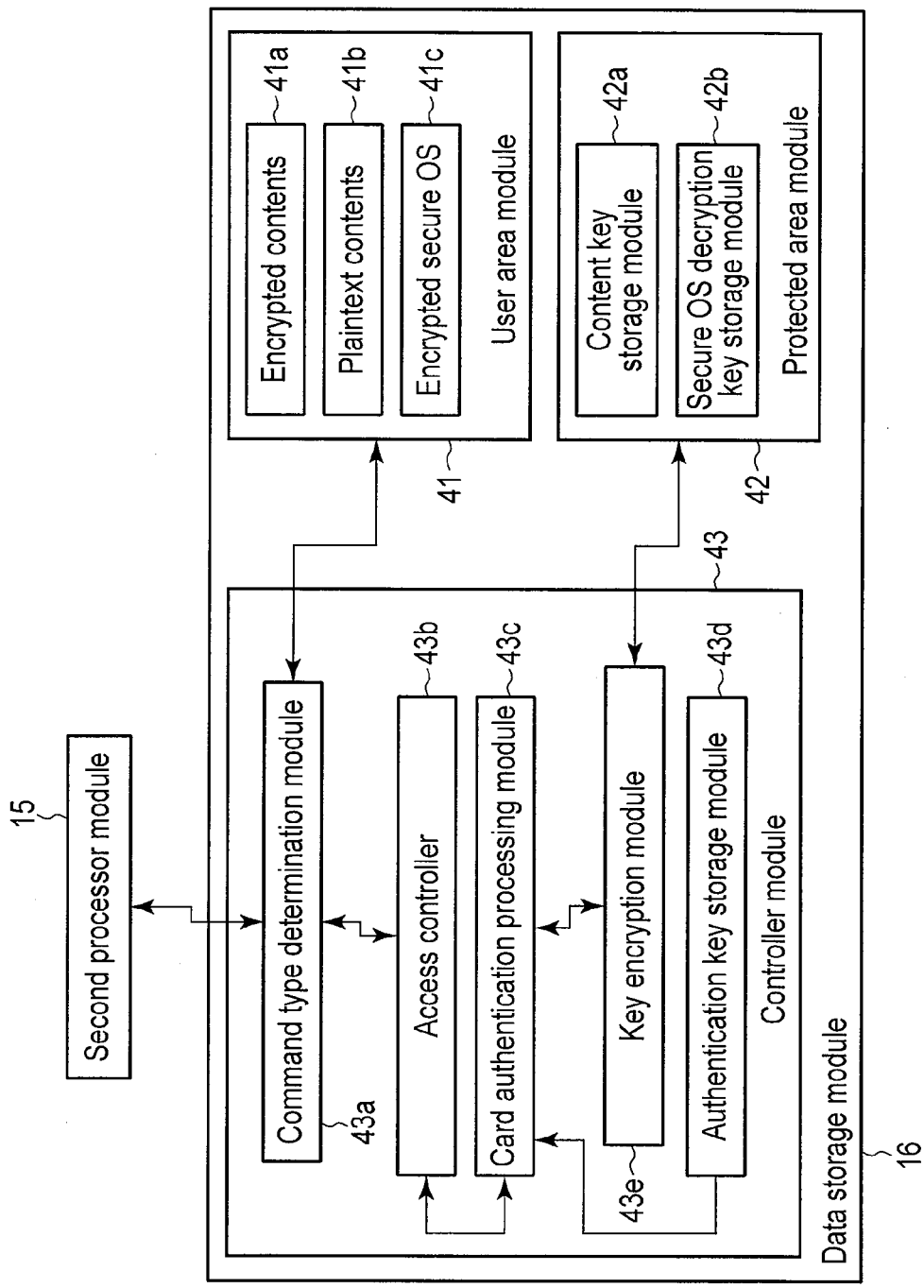
FIG. 22 is a block configuration diagram illustrating an example of a data storage module constituting the information processing device of the second embodiment.

FIG. 22 illustrates an example of the data storage module 16. In FIG. 22, the same module as that in FIG. 9 is designated by the same numeral. The data storage module 16 in FIG. 22 differs from that in FIG. 9 in that an encrypted content 41a, a plaintext content 41b, and an encrypted secure OS 41c in which the secure OS module 38 is encrypted are stored in a user area module 41, and that a protected area module 42 includes a secure OS decryption key storage module 42b in which a secure OS decryption key used to decrypt the encrypted secure OS 41c is stored.

Figure 23:
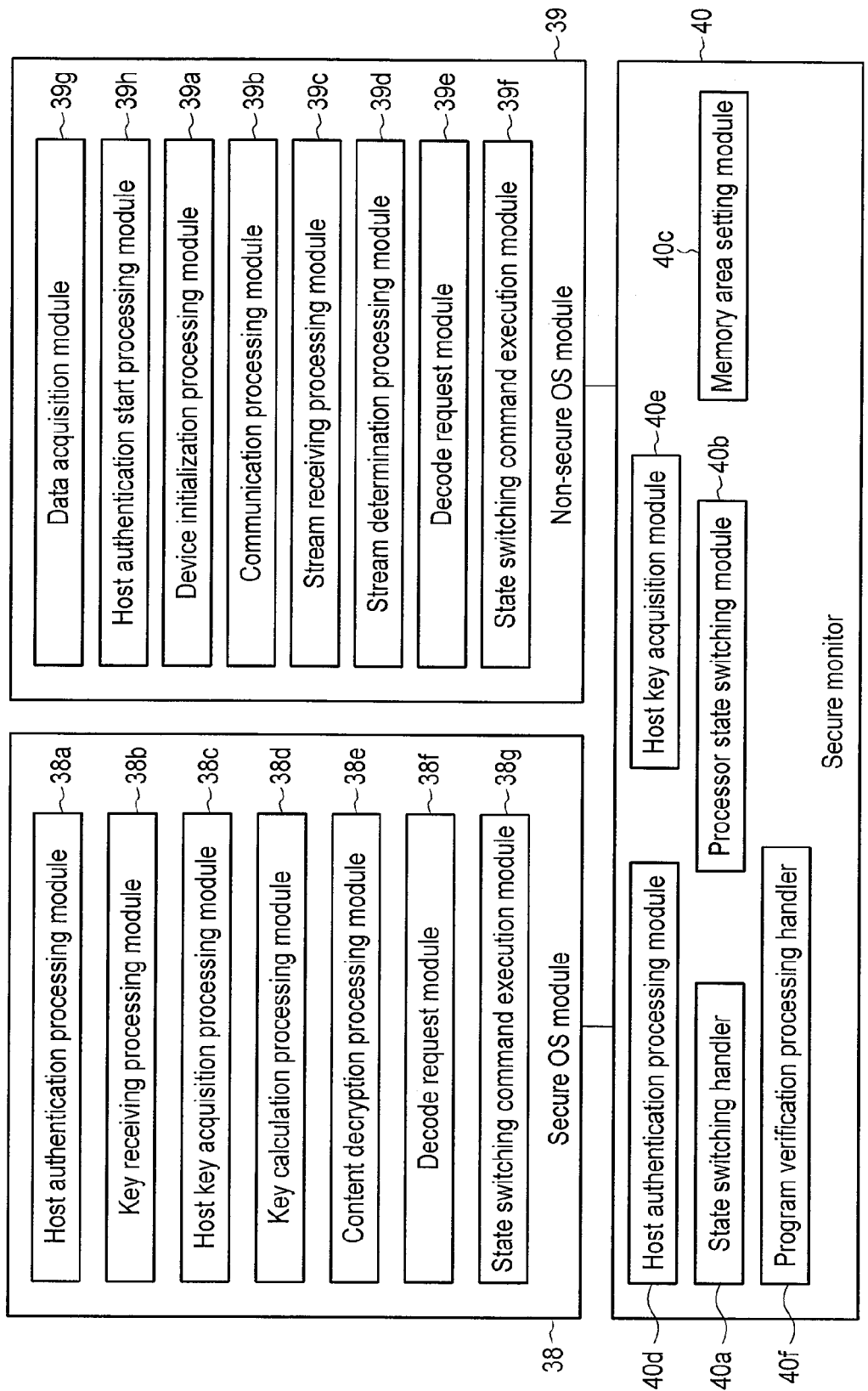
FIG. 23 is a view illustrating an example of software that causes the first processor module of the second embodiment to operate.

FIG. 23 illustrates an example of the software that causes the first processor module 14 to operate. In FIG. 23, the same module as that in FIG. 3 is designated by the same numeral. The software in FIG. 23 differs from that in FIG. 3 in that a secure monitor 40 includes a host authentication processing module 40d that performs the authentication processing with the data storage module 16, a host key acquisition module 40e in which a key necessary for the authentication processing with the data storage module 16, and a program verification processing handler 40f that performs processing of the program verification module 47.

The memory area of the memory module 19 is divided as illustrated in FIG. 4, and the availability of the access to each memory area of the memory module 19 is set as illustrated in FIG. 5.

Figure 24:
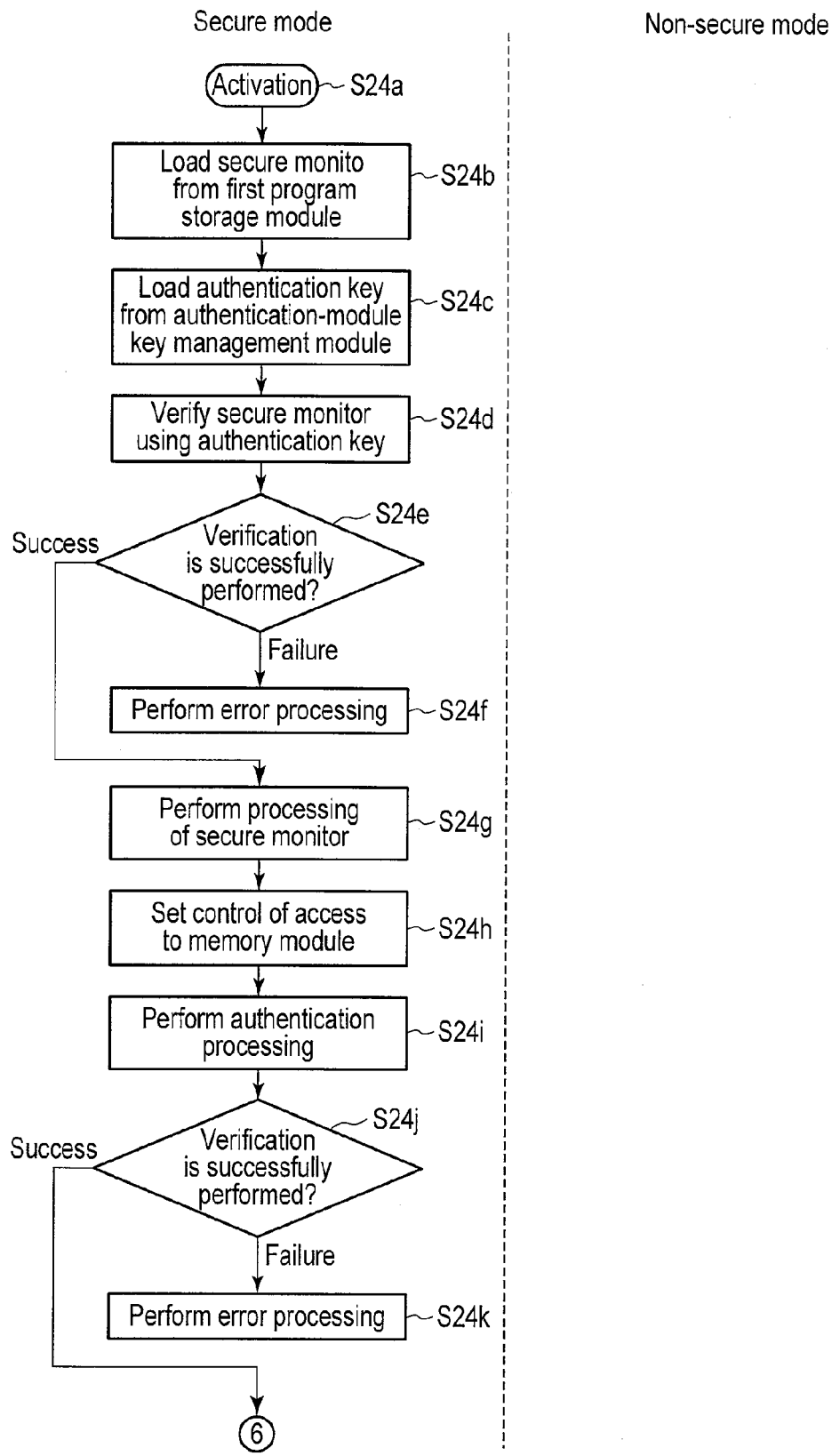
FIG. 24 is a flowchart illustrating part of an example of a processing operation during a boot of the first processor module of the second embodiment including a secure OS.
Figure 25:
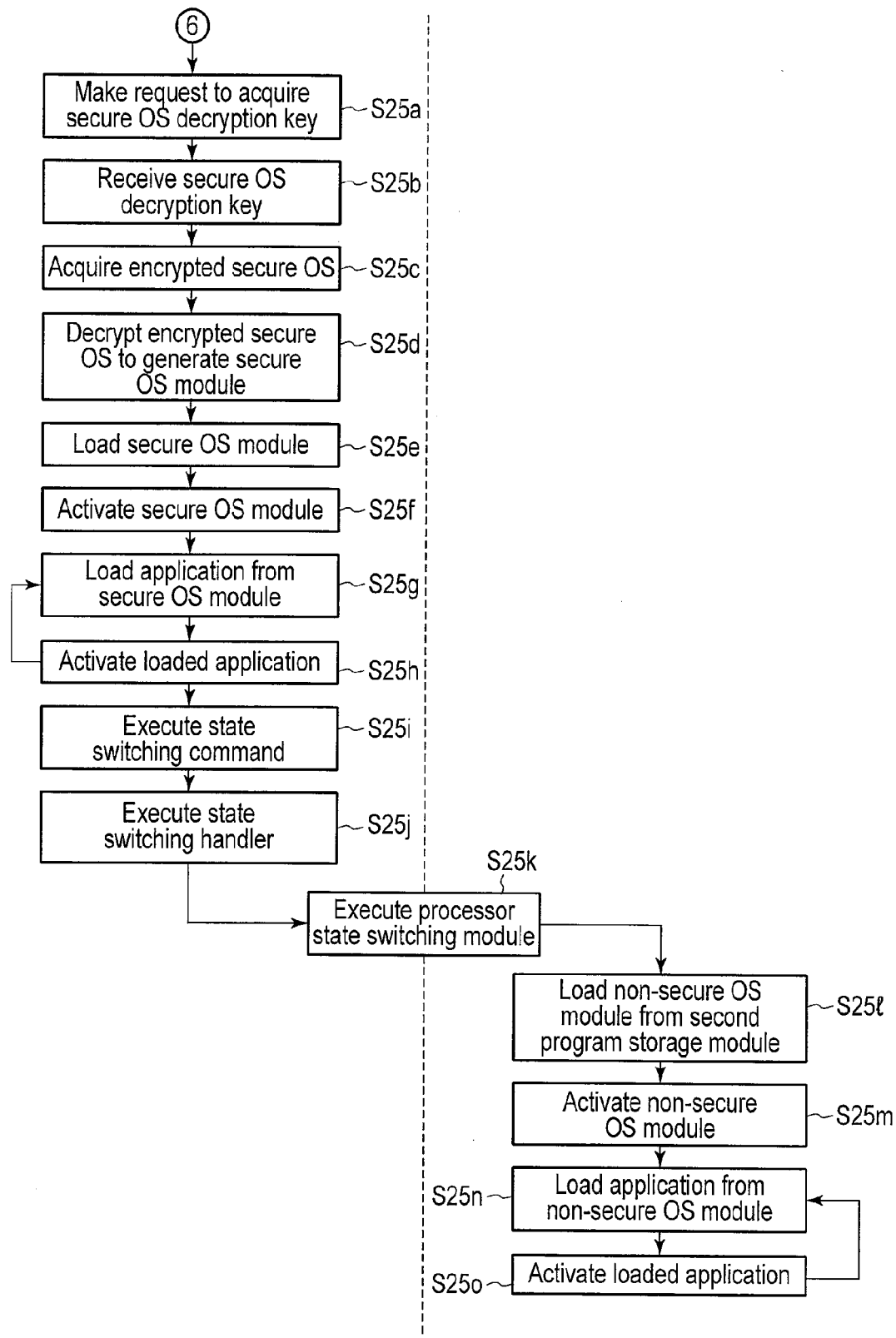
FIG. 25 is a flowchart illustrating the rest of an example of the processing operation during the boot of the first processor module of the second embodiment including the secure OS.

FIGS. 24 and 25 is a flowchart illustrating an example of the processing operation in booting the secure OS of the first processor module 14.

When being started (Step S24a), the first processor module 14 loads the secure monitor 40 from the first program storage module 45 in Step S24b, and loads the verification key stored in the verification-module key management module 48 in Step S24c. The first processor module 14 verifies the secure monitor 40 using the verification key in Step S24d, and determines whether the verification processing is successfully performed in Step S24e. When determining the failure in the verification processing, the first processor module 14 performs the error processing in Step S24f.

When determining that the verification processing is successfully performed in the Step S24e, the first processor module 14 performs the processing of the secure monitor 40 in Step S24g, and causes a memory area setting module 40c to divide a memory area of a memory module 19 and to set the control of the access to the memory area in Step S24h.

The first processor module 14 causes the host authentication processing module 40d to perform the authentication processing with the data storage module 16 using the key stored in the host key acquisition module 40e in Step S24i, and determines whether the authentication processing is successfully performed in Step S24j. When determining the failure in the authentication processing, the first processor module 14 performs the error processing in Step S24k.

When determining that the authentication processing is successfully performed in Step S24j, the first processor module 14 makes a request to the data storage module 16 to acquire the secure OS decryption key in Step S25a, and receives the secure OS decryption key from the data storage module 16 in Step S25b. The first processor module 14 acquires the encrypted secure OS 41c from the data storage module 16 in Step S25c, and decrypts the encrypted secure OS 41c to generate the secure OS module 38 using the secure OS decryption key in Step S25d.

The first processor module 14 loads the secure OS module 38 in Step S25e, and starts the secure OS module 38 in Step S25f. The first processor module 14 loads the necessary application on the secure OS module 38 in Step S25g, and starts the application in Step S25h. Therefore, the first processor module 14 can perform the necessary processing in the secure mode. The pieces of processing in Steps S25g and S25h are repeatedly performed until the starting of the necessary application is completed to execute the state switching command to switch the state of the first processor module 14 to the non-secure mode.

A state switching command execution module 38g of the secure OS module 38 running in the first processor module 14 executes the state switching command in Step S25i. When the state switching command is executed, the first processor module 14 detects the state switching command to cause the processing to transition to a state switching handler 40a of the secure monitor 40 (Step S25j), and the state switching handler 40a executes the processor state switching module 40b of the secure monitor 40 in Step S25k. Therefore, the state of the first processor module 14 changes from the secure mode to the non-secure mode. The first processor module 14 loads the non-secure OS module 39 from the second program storage module 46 in Step S25l, and starts the non-secure OS module 39 in Step S25m.

The first processor module 14 loads the necessary application on the non-secure OS module 39 in Step S25n, and starts the application in Step S25o. Therefore, the first processor module 14 can perform the necessary processing in the non-secure mode. In performing the pieces of processing, such as the processing of decrypting the encrypted contents, in which the secret information is dealt with or the falsification of the processing skip is prevented, the pieces of processing in Steps S25n and S25o are repeatedly performed until a state switching command execution module 39f of the non-secure OS module 39 executes the state switching command to switch the state of the first processor module 14 to the secure mode.

All the contents of the secure OS module 38 are not necessarily encrypted, but part of the contents may be encrypted while the remaining portion is written in the plain text. In this case, the processing in Step S25d is performed only to the encrypted portion. A time necessary for the decryption can be reduced by partially encrypting the secure OS module 38, and therefore a time necessary to load the secure OS module 38 can be reduced.

In the second embodiment, the secure OS module 38 is encrypted, the secure OS module 38 is decrypted using the secure OS decryption key, and the verification of the secure OS module 38 is completed when the secure OS module 38 is correctly decrypted. Alternatively, the hash value of the encrypted secure OS module 38 or plaintext secure OS module 38 is stored in the user area module 41 while the certificate signed by the secret key is attached to the hash value, and the secure OS module 38 may be verified by verifying the certificate in Step S25c. Alternatively, the hash value of the plaintext secure OS module 38 is stored in the user area module 41 while the certificate signed by the secret key is attached to the hash value, and the hash value is verified in acquiring the secure OS in Step S25c to check whether the hash value to which the certificate is attached is equal to the calculated hash value and whether the signature included in the certificate can correctly be verified using the verification key. The verification may be assumed to be successful when the checking is successfully made.

FIGS. 26 and 27 is a flowchart illustrating an example of the processing operation in which the first processor module 14 performs the authentication with the data storage module 16 to acquire the secure OS decryption key stored in the protected area module 42 of the data storage module 16.

In Step S26a, the first processor module 14 makes the authentication request to the second processor module 15, thereby starting the processing operation. When the second processor module 15 sends back the reception of the request in response to the authentication request, in the first processor module 14, a host authentication processing module 28 reads the authentication public key stored in the host key management module 29 in Step S26b. When the error response is received as the response to the authentication request, the subsequent processing is not performed.

On the other hand, in Step S26d, the second processor module 15 determines whether the first processor module 14 is in the secure mode or the non-secure mode based on the state of the first processor module 14, which is acquired by a processor state management module 36 in Step S26c. When the first processor module 14 is in the non-secure mode, namely, when the non-secure OS module 39 runs on the first processor module 14, the second processor module 15 performs the error processing (for example, the processing of cutting the session with the data storage module 16) in Step S26e.

When the first processor module 14 is determined to be in the secure mode in Step S26d, namely, when the secure OS module 38 runs on the first processor module 14, the second processor module 15 makes the authentication request to the data storage module 16 in Step S26f. In the data storage module 16, a card authentication processing module 43c reads the authentication public key stored in the authentication key storage module 43d in Step S26g.

Therefore, the mutual authentication is performed through the second processor module 15 by the first processor module 14 in Step S26h and by the data storage module 16 in Step S26i. Well-known public key algorithms, such as the RSA and the elliptic curve cryptosystem, are used as the authentication algorithm. When the mutual authentication is successfully performed, the first processor module 14 generates the session key based on the authentication processing in Step S26j, and the second processor module 15 generates the session key based on the authentication processing in Step S26k.

The second processor module 15 reads the plaintext secure OS decryption key from the secure OS decryption key storage module 42b in the protected area module 42 in Step S26l, encrypts the plaintext secure OS decryption key using the session key in Step S27a, and transmits the encrypted secure OS decryption key to the second processor module 15 in Step S27b. A key acquisition module 34 acquires the encrypted secure OS decryption key transmitted to the second processor module 15.

In Step S27d, the second processor module 15 determines whether the first processor module 14 is in the secure mode or the non-secure mode based on the state of the first processor module 14, which is acquired by the processor state management module 36 in Step S27c. When the first processor module 14 is in the non-secure mode, namely, when the non-secure OS module 39 runs on the first processor module 14, the second processor module 15 performs the error processing (for example, the processing of cutting the session with the data storage module 16) in Step S27e.

When the first processor module 14 is determined to be in the secure mode in Step S27d, namely, when the secure OS module 38 runs on the first processor module 14, the second processor module 15 transmits the encrypted secure OS decryption key acquired by the key acquisition module 34 to the first processor module 14 through the key transmitter 35 in Step S27f.

In the first processor module 14, a key receiver 26 receives the encrypted secure OS decryption key supplied from the second processor module 15 in Step S27g, and a key calculation processing module 27 decrypts the encrypted secure OS decryption key using the session key in Step S27h. Therefore, the first processor module 14 can acquire the secure OS decryption key stored in the protected area module 42 of the data storage module 16.

As described above, the processing of checking the state of the first processor module 14 is performed when the second processor module 15 receives the authentication request from the first processor module 14 and when the second processor module 15 transmits the encrypted content key to the first processor module 14. Alternatively, because the second processor module 15 always monitors the state of the first processor module 14, the authentication processing and the processing of transmitting the encrypted content key may be interrupted when the signal output from a processor state notification module 31 of the first processor module 14 becomes the non-secure mode, namely, when the processor state management module 36 of the second processor module 15 detects that the state of the first processor module 14 is in the non-secure mode.

According to the second embodiment, the first processor module 14 performs the secure monitor 40 including the boot loader stored in the first program storage module 45 and the secure OS module 38 stored in the data storage module 16 after verifying the secure monitor 40 and the secure OS module 38. Therefore, even if the secure OS module 38 is falsified, the falsification can be detected at the boot state to prevent the execution of the illegal program in the secure mode, and only the secure OS module 38 can be executed on the already-verified secure mode. As a result, the illegal acquisition of the encrypted contents stored in the data storage module 16 can further be prevented.

The secure OS decryption key is stored in the protected area module 42 of the data storage module 16, in the first processor module 14, the host authentication processing module 40d of the secure monitor 40 performs the mutual authentication with the data storage module 16, and the secure OS decryption key is acquired to decrypt the encrypted secure OS. Therefore, the contents of the secure OS module 38 are hardly seen from the outside, and the secret information can be protected.

FIG. 28 illustrates another example of the first processor module 14 and second processor module 15. In FIG. 28, the same module as that in FIG. 20 is designated by the same numeral. The first processor module 14 and second processor module 15 in FIG. 28 differ from those in FIG. 20 in that an authentication processing module 50 and a key management module 51 are added to the first processor module 14 and that an authentication processing module 52 and a key management module 53 are added to the second processor module 15.

The authentication processing module 50 of the first processor module 14 and the authentication processing module 52 of the second processor module 15 perform processor mutual authentication with the second processor module 15 and the first processor module 14 using keys stored in key management modules 51 and 53, respectively, thereby enhancing the reliability of the contents notified to the processor state management module 36 by the processor state notification module 31.

FIG. 34 is a flowchart illustrating an example of the processing operation in which the first processor module 14 and the second processor module 15 perform the processor mutual authentication. In Step S34*a*, the first processor module 14 makes a processor mutual authentication request to the second processor module 15, thereby starting the processing operation.

The second processor module 15 starts the processor authentication processing in Step S34*b*, whereby the first processor module 14 performs the processor authentication processing in Step S34*c* and the second processor module 15 performs the processor authentication processing in Step S34*d*. A result, the processor authentication processing is stored in the authentication processing module 52 of the second processor module 15.

In Step S34*e*, the second processor module 15 receives a host authentication request to authenticate the data storage module 16 from the first processor module 14. At this point, the authentication processing module 52 of the second processor module 15 determines whether the processor mutual authentication is successfully performed (Step S34*f*). When the processor mutual authentication is successfully performed, the authentication processing module 52 acquires the state of the first processor module 14 (Step S34*h*). When determining the failure in the processor mutual authentication, the authentication processing module 52 performs the error processing (for example, the processing of terminating the session with the data storage module 16 or transmission of an error signal in response to the authentication request) in Step S34*g*.

The subsequent processing is identical to that in Step S13*c*. That is, the authentication processing module 52 determines whether the processor mutual authentication is successfully performed, and the authentication processing module 52 performs the processing of permitting the access to the protected area module 42 of the data storage module 16 only when the processor mutual authentication is successfully performed.

When the authentication processing module 52 determines the failure in the mutual authentication with the second processor module 15, namely, when the key management module 51 of the first processor module 14 does not have the legitimate key, the first processor module 14 fails in the authentication processing with the data storage module 16, but cannot access the protected area module 42 of the data storage module 16. Therefore, the first processor module 14 cannot acquire the encrypted content key and secure OS decryption key, which are stored in the protected area module 42, and therefore the first processor module 14 cannot decrypt the encrypted content. That is, the second processor module 15 can permit only the first processor module 14 having the legitimate key to decrypt the contents.

Figure 29:
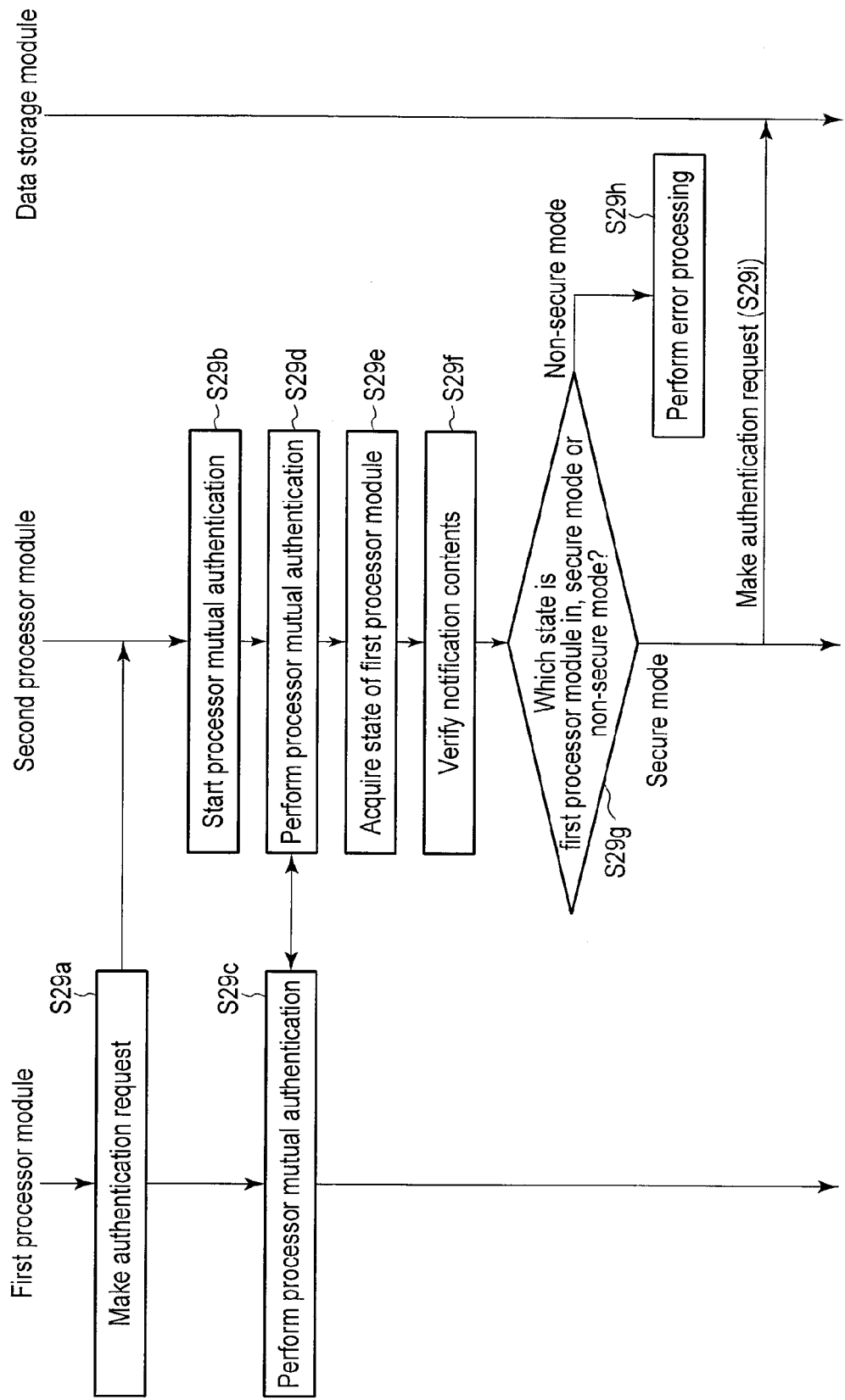
FIG. 29 is a flowchart illustrating an example of a processing operation in which the first and second processor modules of the second embodiment perform mutual authentication.

FIG. 29 illustrates a modification of the processing operation in FIG. 34. The pieces of processing to Step S29*d* are identical to those in FIG. 34. Then, in the second processor module 15, the processor state management module 36 receives the notification from the first processor module 14 to acquire the state of the first processor module 14 in Step S29*e*, and verifies the notification contents in Step S29*f*. For example, the verification of the notification contents includes a technique in which a secret value shared through the processor mutual authentication is used as the session key, the processor state notification module 31 encrypts the state of the first processor module 14 to notify the second processor module 15 of the state of the first processor module 14, and the second processor module 15 decrypts the state of the first processor module 14, and a technique in which the secret value shared through the processor mutual authentication is used as the session key, the processor state notification module 31 calculates a hash value with a key for the state of the first processor module 14 along with the value indicating the state of the first processor module 14, and the second processor module 15 verifies the hash value with the key.

In Step S29*g*, the second processor module 15 determines whether the first processor module 14 is in the secure mode or the non-secure mode. When determining that the first processor module 14 is in the non-secure mode, the second processor module 15 performs the error processing (for example, the processing of terminating the session with the data storage module 16) in Step S29*h*.

When determining that the first processor module 14 is in the secure mode in Step S29*g*, the second processor module 15 makes the authentication request to the data storage module 16 in Step S29*i*. Then, the mutual authentication is performed between the first processor module 14 and the second processor module 15, and the pieces of processing in FIGS. 26 and 27 are performed.

The processor mutual authentication is performed between the first processor module 14 and the second processor module 15 to enhance the reliability of the contents notified to the processor state management module 36 by the processor state notification module 31 in the first embodiment in FIG. 2.

FIG. 30 illustrates another example of the data storage module 16. In FIG. 30, the same module as that in FIG. 22 is designated by the same numeral. The data storage module 16 in FIG. 30 differs from that in FIG. 22 in that the encrypted secure OS 41*c* is stored in not the user area module 41 but the second program storage module 46.

As described above with reference to FIGS. 15 and 16, the second processor module 15 can access the user area module 41 of the data storage module 16 only when the first processor module 14 is in the non-secure mode, and therefore the secure OS module 38 can be prevented from constructing all the pieces of processing performed by the first processor module 14.

As illustrated in FIG. 15, a data access determination module 44 that permits the data access module 33 to access the user area module 41 of the data storage module 16 only when the first processor module 14 is in the non-secure mode based on the state of the first processor module 14 received by the processor state management module 36 is provided in the configuration of the second processor module 15.

Figure 31:
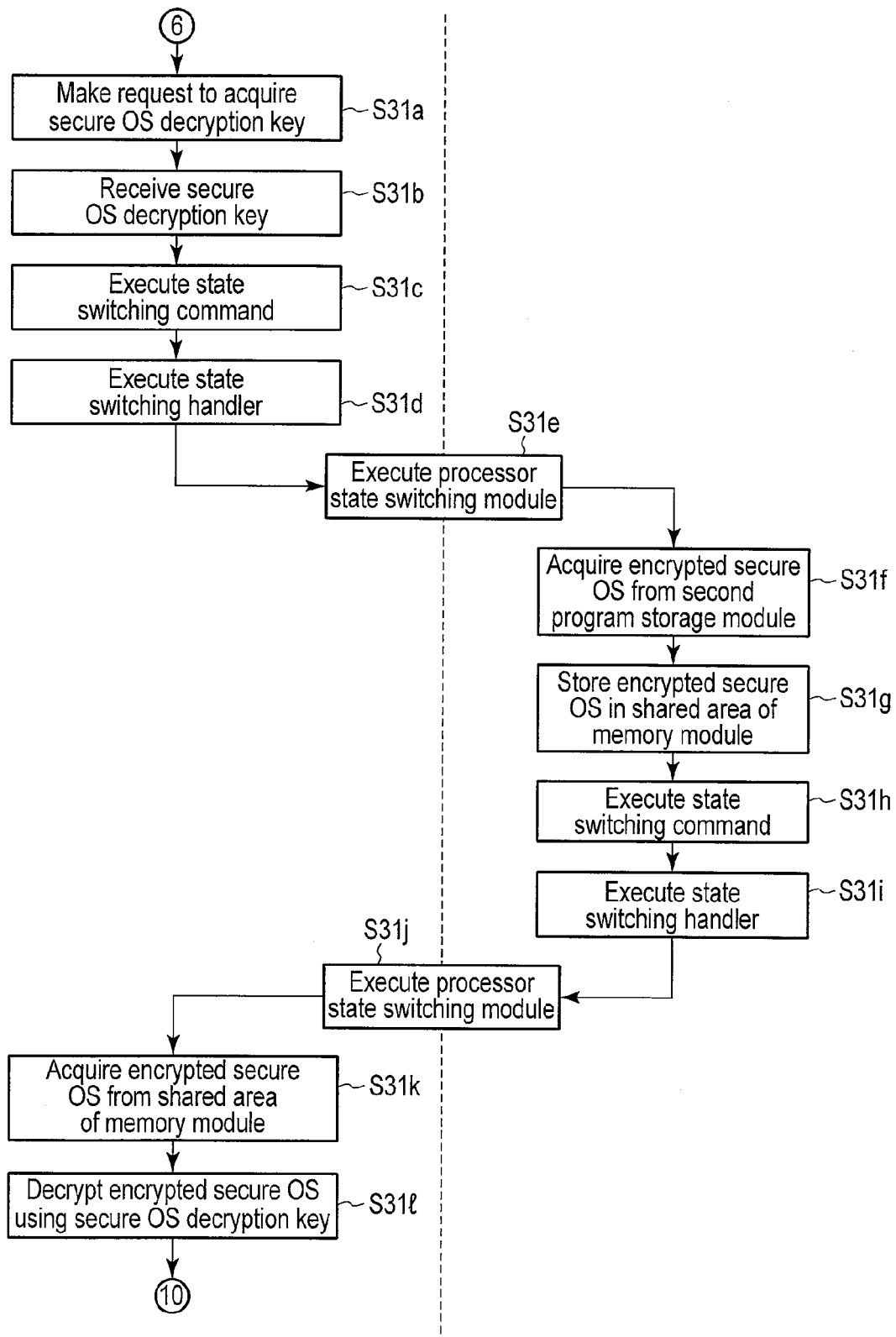
FIG. 31 is a flowchart illustrating part of another example of the processing operation during the boot of the first processor module of the second embodiment including the secure OS.

FIGS. 31 and 32 is a flowchart illustrating another example of the processing operation in booting the secure OS of the first processor module 14. When the authentication processing is determined to be successfully performed in Step S24*j* in FIG. 24, the first processor module 14 makes the request to the data storage module 16 to acquire the secure OS decryption key in Step S31*a*, and receives the secure OS decryption key from the data storage module 16 in Step S31*b*.

The state switching command execution module 38*g* of the secure OS module 38 running in the first processor module 14 executes the state switching command in Step S31*c*. When the state switching command is executed, the first processor module 14 detects the state switching command to cause the processing to transition to the state switching handler 40*a* of the secure monitor 40 (Step S31*d*), and the state switching handler 40*a* executes the processor state switching module 40*b* of the secure monitor 40 to switch the state of the first processor module 14 to the non-secure mode in Step S31*e*.

In the non-secure mode, the first processor module 14 acquires the encrypted secure OS 41*c* stored in the second program storage module 46 in Step S31*f*, and stores the acquired encrypted secure OS 41*c* in the shared area of the memory module 19 in Step S31*g*.

The first processor module 14 executes the state switching command using the state switching command execution module 39*f* in Step S31*h*, the first processor module 14 causes the processing to transition to the state switching handler 40*a* of the secure monitor 40 in Step S31*i*, and the state switching handler 40*a* executes the processor state switching module 40*b* of the secure monitor 40 to switch the state of the first processor module 14 to the secure mode in Step S31*j*.

In the secure mode, the first processor module 14 acquires the encrypted secure OS 41*c* from the shared area of the memory module 19 in Step S31*k*, and decrypts the acquired encrypted secure OS 41*c* using the previously-acquired secure OS decryption key in Step S31*l*.

The first processor module 14 loads the secure OS module 38 in Step S32*a*, and activates the secure OS module 38 in Step S32*b*. The first processor module 14 loads the necessary application on the secure OS module 38 in Step S32*c*, and starts the application in Step S32*d*. Therefore, the first processor module 14 can perform the necessary processing in the secure mode. The pieces of processing in Steps S32*c* and S32*d* are repeatedly performed until the state switching command to switch the state of the first processor module 14 to the non-secure mode comes.

The first processor module 14 executes the state switching command using the state switching command execution module 38*g* in Step S32*e*, the first processor module 14 causes the processing to transition to the state switching handler 40*a* of the secure monitor 40 in Step S32*f*, and the state switching handler 40*a* executes the processor state switching module 40*b* of the secure monitor 40 in Step S32*g*. The first processor module 14 loads the non-secure OS module 39 from the second program storage module 46 in Step S32*h*, and starts the non-secure OS module 39 in Step S32*i*.

The first processor module 14 loads the necessary application on the non-secure OS module 39 in Step S32*j*, and starts the application in Step S32*k*. Therefore, the first processor module 14 can perform the necessary processing in the non-secure mode. The pieces of processing in Steps S32*j* and S32*k* are repeatedly performed until the start of the application on the non-secure OS module 39 is completed.

In the configuration, the encrypted secure OS 41*c* can be acquired in the non-secure mode by storing the encrypted secure OS 41*c* in the second program storage module 46. Therefore, the access to the user area module 41 of the data storage module 16 can be permitted only when the first processor module 14 is in the non-secure mode. Therefore, the secure OS module 38 can be prevented from constructing all the pieces of processing performed by the first processor module 14. When the secure OS module 38 constructs all the pieces of processing performed by the first processor module 14, the software size is enlarged, which increases the risk of the vulnerability. Originally, the processing in which the secret information is not dealt with and the processing in which the verification of the falsification is not required are constructed by the non-secure OS module 39, which allows the increase in size and the vulnerability increase to be prevented in the software executed by the secure OS module 38.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first processor configured to selectively switch between a secure mode and a non-secure mode, to perform data processing in each mode, and to report state information indicative of the mode of the first processor;
a storage module comprising a protected area and a user area;
a second processor configured to access the storage module based on a request from the first processor;
a key managing module configured to manage a first key in order to restrict access to the protected area of the storage module;
an authenticating module configured to permit access to the protected area only when an authentication performed using the first key is successful; and
a program storage module configured to store a secure monitor and a boot loader,
wherein the boot loader is configured to activate the secure monitor, and
the secure monitor is configured to switch between the secure mode and the non-secure mode and to activate an operating system for causing the first processor to operate in the secure mode; and
wherein the second processor comprises:
a first access determining module configured to permit a first data accessing module to access the storage module when the first processor is in the secure mode, wherein the first data accessing module is configured to receive data for authentication from the storage module and to transmit the data for authentication to the first processor, based on a request from the first processor, and
a second data accessing module configured to access the user area of the storage module based on a request from the first processor, and
wherein the operating system is encrypted; and
wherein a decryption key for the encrypted operating system is stored in the protected area of the storage module.

2. The information processing apparatus of claim 1, wherein
the secure monitor comprises
an authentication key managing module configured to manage a second key for the authentication with the storage module, and
an authenticating module configured to perform the authentication with the storage module by using the second key, and the secure monitor is configured to acquire a decryption key used for decrypting the operating system from the protected area when the authentication is successful and to decrypt the encrypted operating system in order to activate the first processor in the non-secure mode.

3. The information processing apparatus of claim 2, wherein
the secure monitor is configured to acquire the decryption key by performing the authentication with the storage module using the second key, and to decrypt the encrypted operating system using the decryption key when the first processor is in the secure mode.

4. The information processing apparatus of claim 1, wherein
the program storage module stores a second operating system configured to causes the first processor to operate in the non-secure mode,
the first processor is configured such that a first program for activating the boot loader, the secure monitor, and the operating system in the secure mode and a second program for activating a second operating system in the non-secure mode are activated in this order.

5. The information processing apparatus of claim 1, wherein the second processor further comprises a second access determining module configured to permit the second data accessing module to access the storage module only when the first processor is in the non-secure mode, based on the state information.

6. The information processing apparatus of claim 1, wherein
the operating system stored in the user area comprises an electronic signature which is computed beforehand from a hash value of the operating system by using a secret key, and
the secure monitor comprises a public key corresponding to the secret key, and is configured to compute the hash value of the operating system when the first processor is in the secure mode, when activating the operating system, to verity the electronic signature using the public key, and to activate the operating system only when the verification succeeds.

7. The information processing apparatus of claim 1, wherein
the program storage module stores the encrypted operating system for causing the first processor to operate in the non-secure mode.

8. The information processing apparatus of claim 1, further comprising a ROM storing the boot loader.

9. The information processing apparatus of claim 2, wherein
the first processor comprises a first key managing module configured to manage a first key used for mutual authentication with the second processor,
and the second processor comprises a second key managing module configured to manage a second key used for mutual authentication with the first processor, a mutual-authenticating module configured to perform mutual authentication with the first processor using a second key managed by the second key managing module before the first data accessing module accesses the protected area of the storage module, in order to confirm a validity of the state information reported from the first processor, and a third access determining module configured to permit the first data accessing module to access the storage module only when the mutual authentication by the mutual-authenticating module is successful.

* * * * *